(12) United States Patent
Xue et al.

(10) Patent No.: US 12,177,163 B2
(45) Date of Patent: Dec. 24, 2024

(54) METHOD AND APPARATUS OF DETERMINING FREQUENCY RESOURCES IN NEXT GENERATION CELLULAR NETWORKS

(71) Applicant: Samsung Electronics Co., Ltd., Suwon-si (KR)

(72) Inventors: Peng Xue, Suwon-si (KR); Yeohun Yun, Hwaseong-si (KR); Hyunseok Ryu, Yongin-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 17/826,571

(22) Filed: May 27, 2022

(65) Prior Publication Data

US 2022/0312394 A1    Sep. 29, 2022

Related U.S. Application Data

(63) Continuation of application No. 16/637,119, filed as application No. PCT/KR2018/009223 on Aug. 10, 2018, now Pat. No. 11,350,397.

(Continued)

(51) Int. Cl.
*H04L 5/00* (2006.01)
*H04W 72/0453* (2023.01)

(52) U.S. Cl.
CPC .......... *H04L 5/0092* (2013.01); *H04L 5/0001* (2013.01); *H04L 5/0007* (2013.01); *H04L 5/001* (2013.01); *H04W 72/0453* (2013.01)

(58) Field of Classification Search
CPC .......................... H04L 5/0001; H04L 5/0092
See application file for complete search history.

(56) References Cited

U.S. PATENT DOCUMENTS 11,109,332 B2 * 8/2021 Xue .................... H04L 27/2657
2011/0243039 A1 10/2011 Papasakellariou et al.
(Continued)

FOREIGN PATENT DOCUMENTS

CN          102111211 A     6/2011
CN          102845014 A    12/2012
(Continued)

OTHER PUBLICATIONS

NTT Docomo, Inc., "Status Report of Study on New Radio Access Technology", RP-170376, 3GPP TSG RAN meeting #75, Dubrovnik, Croatia, Feb. 28, 2017.

(Continued)

*Primary Examiner* — Kevin C. Harper
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method by a terminal for determining frequency resources in a cellular network is provided.

16 Claims, 37 Drawing Sheets

Related U.S. Application Data

(60) Provisional application No. 62/565,312, filed on Sep. 29, 2017, provisional application No. 62/555,281, filed on Sep. 7, 2017, provisional application No. 62/543,569, filed on Aug. 10, 2017.

(56) References Cited

U.S. PATENT DOCUMENTS

| | | | |
|---|---|---|---|
| 2015/0296486 A1* | 10/2015 | Park | H04W 76/15 |
| | | | 370/329 |
| 2015/0327180 A1 | 11/2015 | Ryu et al. | |
| 2016/0072614 A1 | 3/2016 | Blankenship et al. | |
| 2017/0135052 A1 | 5/2017 | Lei et al. | |
| 2017/0155479 A1 | 6/2017 | Sun et al. | |
| 2017/0223727 A1 | 8/2017 | Davydov et al. | |
| 2018/0368145 A1 | 12/2018 | Abdoli et al. | |
| 2019/0028315 A1* | 1/2019 | Park | H04L 5/0044 |
| 2019/0053138 A1 | 2/2019 | Wu | |
| 2019/0280843 A1 | 9/2019 | Jeon et al. | |
| 2020/0084773 A1* | 3/2020 | Li | H04W 72/0453 |
| 2020/0120676 A1* | 4/2020 | Abdoli | H04W 72/0453 |

FOREIGN PATENT DOCUMENTS

| | | |
|---|---|---|
| CN | 106664664 A | 5/2017 |
| CN | 106961734 A | 7/2017 |
| WO | 2016/159738 A1 | 10/2016 |
| WO | 2016/204456 A1 | 12/2016 |
| WO | 2017/119429 A1 | 7/2017 |

OTHER PUBLICATIONS

Chinese Notice of Allowance dated Jun. 16, 2023, issued in Chinese Patent Application No. 201880051830.3.
Huawei et al., "Overview of wider bandwidth operations", R1-1709972, 3GPP TSG RAN WG1 NR Ad Hoc Meeting, Qingdao, China, Jun. 17, 2017.
Ericsson, "Measurement configuration", R2-1706947, 3GPP TSG-RAN WG2 Ad Hoc, Qingdao, China, Jun. 16, 2017.
Nokia et al., "On wider band aspects of NR", R1-1710883, 3GPP TSG-RAN WG1 Meeting NR#2, Qingdao, China, Jun. 16, 2017.
Mediatek Inc., "Report of email discussion [98#33][NR/Measurement configuration]", R2-1706570, 3GPP TSG-RAN WG2 NR#2, Qingdao, China, Jun. 16, 2017.
Indian Office Action dated Apr. 21, 2022, issued in a counterpart Indian Application No. 202037005589.
Korean Office Action dated Dec. 1, 2022, issued in a counterpart Korean Application No. 10-2020-7007102.
Chinese Office Action dated Jan. 19, 2023, issued in a counterpart Chinese Application No. 2018800518303.
NEC; Prb indexing for RMSI in NR; 3GPP TSG-RAN WG1 NR Ad-Hoc#2; R1-1710244; Jun. 17, 2017, Qingdao, P.R. China.

* cited by examiner

FIG. 7A

| | 8n | 8n+1 | 8n+2 | 8n+3 | 8n+4 | 8n+5 | 8n+6 | 8n+7 | 8n+8 | 8n+9 | 8n+10 | 8n+11 | 8n+12 | 8n+13 | 8n+14 | 8n+15 |
|---|---|---|---|---|---|---|---|---|---|---|---|---|---|---|---|---|
| SCS#0 | | | | | | | | | | | | | | | | |
| SCS#1 | 4m | | 4m+1 | | 4m+2 | | 4m+3 | | 4m+4 | | 4m+5 | | 4m+6 | | 4m+7 | |
| SCS#2 | 2j | | | | 2j+1 | | | | 2j+2 | | | | 2j+3 | | | |
| SCS#3 | i | | | | | | | | i+1 | | | | | | | |

FIG. 7B

| | | | | | | | | | | | | | | | | |
|---|---|---|---|---|---|---|---|---|---|---|---|---|---|---|---|---|
| SCS#0 | 8n | 8n+1 | 8n+2 | 8n+3 | 8n+4 | 8n+5 | 8n+6 | 8n+7 | 8n+8 | 8n+9 | 8n+10 | 8n+11 | 8n+12 | 8n+13 | 8n+14 | 8n+15 |
| SCS#1 | 4n | | 4n+1 | | 4n+2 | | 4n+3 | | 4n+4 | | 4n+5 | | 4n+6 | | 4n+7 | |
| SCS#2 | 2n | | | | 2n+1 | | | | 2n+2 | | | | 2n+3 | | | |
| SCS#3 | n | | | | | | | | n+1 | | | | | | | |

FIG. 7C

| | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| SCS#0 | 16m+15 | 16m+13 | 16m+11 | 16m+9 | 16m+7 | 16m+5 | 16m+3 | 16m+1 | 15 | 13 | 11 | 9 | 7 | 5 | 3 | 1 | Carrier Center | 0 | 2 | 4 | 6 | 8 | 10 | 12 | 14 | 16n | 16n+2 | 16n+4 | 16n+6 | 16n+8 | 16n+10 | 16n+12 | 16n+14 |
| SCS#1 | 8m+7 | | 8m+5 | | 8m+3 | | 8m+1 | | 7 | | 5 | | 3 | | 1 | | | 0 | | 2 | | 4 | | 6 | | 8n | | 8n+2 | | 8n+4 | | 8n+6 | |
| SCS#2 | 4m+3 | | | | 4m+1 | | | | 3 | | | | 1 | | | | | 0 | | | | 2 | | | | 4n | | | | 4n+2 | | | |
| SCS#3 | 2m+1 | | | | | | | | 1 | | | | | | | | | 0 | | | | | | | | 2n | | | | | | | |

METHOD AND APPARATUS OF DETERMINING FREQUENCY RESOURCES IN NEXT GENERATION CELLULAR NETWORKS

CROSS-REFERENCE TO RELATED APPLICATION(S)

This application is a continuation application of prior application Ser. No. 16/637,119, filed on Feb. 6, 2020, which will be issued as U.S. patent Ser. No. 11/350,397 on May 31, 2022, which is a U.S. National Stage application under 35 U.S.C. § 371 of an International application number PCT/KR2018/009223, filed on Aug. 10, 2018, which is based on and claimed the benefit of a U.S. Provisional application Ser. No. 62/543,569, filed on Aug. 10, 2017, in the U.S. Patent and Trademark Office, of a U.S. Provisional application Ser. No. 62/555,281, filed on Sep. 7, 2017, in the U.S. Patent and Trademark Office, of a U.S. Provisional application Ser. No. 62/565,312, filed on Sep. 29, 2017, in the U.S. Patent and Trademark Office, the disclosure of each of which is incorporated by reference herein in its entirety.

TECHNICAL FIELD

The disclosure relates to a method and an apparatus for receiving/transmitting data in a cellular network. More particularly, the disclosure relates to the frequency resource and PRB index determination in next generation cellular networks.

BACKGROUND ART

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In the recent years several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system suffers from lack of resources to meet the growing demand for high speed data services. Therefore, the 5G wireless communication system is being developed to meet the growing demand of various services with diverse requirements, e.g., high speed data services, ultra-reliability, low latency applications and massive machine type communication. Due to the widely supported services and various performance requirements, there is high potential that the user equipment (UE) may have different capabilities, e.g., in terms of supported UE bandwidth (BW). Flexible UE bandwidth support needs to be considered in the design of 5G network, and the flexible network access for UEs with different bandwidth capabilities.

In the 4G LTE networks, flexible system bandwidth is supported (e.g., 1.4 MHz/3 MHz/5 MHz/10 MHz/15 MHz/20 MHz), and the channel designs are mostly based on the operated system bandwidth. This gives mandatory requirement that the UE should operate in the same bandwidth with the system, except in initial access when UE has no information of the system bandwidth. Since the UEs have no information of the system bandwidth in the initial access, the essential signals and channels are transmitted based on a pre-defined bandwidth, e.g., the minimum bandwidth supported by the networks. The transmission of the synchronization signals (e.g., primary synchronization signal (PSS) and secondary synchronization signal (SSS)) and broadcast channel (e.g., physical broadcast channel (PBCH)) is fixed in the center of the system bandwidth and limited within a pre-defined bandwidth, which is accessible to all UEs. After receiving the PBCH, it is possible that the UEs obtain the system bandwidth, which is indicated in the master information block (MIB) carried by PBCH. The transmissions of other channels/signals occupy the full system bandwidth, because the UEs can access the actual system bandwidth after obtaining the system bandwidth information. For the UEs with less bandwidth than the system bandwidth, it is impossible for the UEs to access the channel which occupies full system bandwidth. There is limitation of the current systems to support flexible access for UEs with various bandwidths.

In the future cellular networks, wide range of frequency bands may be used and wider system bandwidth may be used, and wideband carrier and narrowband carrier may coexist in a frequency band. Considering flexible carrier deployment, the carrier information needs to be informed to UEs. In addition, it is possible that the UEs may support flexible bandwidth. In the disclosure, the methods of frequency resource determination are described for the future cellular networks.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

According to exemplary embodiments of the disclosure, the frequency resource and PRB index determination method and apparatus are provided.

Solution to Problem

In accordance with a first aspect of the disclosure, a method by a terminal for transmitting or receiving at least one carrier in a cellular network is provided. The method comprises receiving information on frequency position of a common reference point for resource block grids from a base station, receiving information on offset in frequency domain between the common reference point and a location of the at least one carrier from the base station, determining the location of the at least one carrier based on the information on the offset, and transmitting or receiving the at least one carrier to or from the base station.

In accordance with a second aspect of the disclosure, a method by a base station for transmitting or receiving at least one carrier is provided. The method comprises transmitting information on frequency position of a common reference point for resource block grids to a terminal, transmitting information on offset in frequency domain between the common reference point and a location of the at least one carrier to the terminal, determining the location of the at least one carrier based on the information on the offset, and transmitting or receiving the at least one carrier.

In accordance with a third aspect of the disclosure, a terminal in a cellular network is provided. The terminal includes a transceiver and a controller coupled with the transceiver. The transceiver is configured to receive signals from a base station and to transmit signals to the base station. The controller is configured to control the transceiver to receive information on frequency position of a common reference point for resource block grids from the base station, to control the transceiver to receive information on offset in frequency domain between the common reference point and a location of at least one carrier from the base station, to determine the location of the at least one carrier based on the information on the offset, and to control the transceiver to transmit or receive the at least one carrier.

In accordance with a fourth aspect of the disclosure, a base station in a cellular network is provided. The base station includes a transceiver and a controller coupled with the transceiver. The transceiver is configured to receive signals from a terminal and to transmit signals to the terminal. The controller is configured to control the transceiver to transmit information on frequency position of a common reference point for resource block grids to the terminal, to control the transceiver to transmit information on offset in frequency domain between the common reference point and a location of the at least one carrier to the terminal, to determine the location of the at least one carrier based on the information on the offset, and to control the transceiver to transmit the at least one carrier.

Advantageous Effects of Invention

The frequency resource and PRB index determination method and apparatus according to exemplary embodiments of the disclosure control specific operations to be executed in association with the frequency resource determination and PRB index usage in the mobile communication supporting one or multiple carriers and/or BWPs, thereby preventing a UE from malfunctioning.

The frequency resource and PRB index determination method and apparatus according to exemplary embodiments of the disclosure is also capable of guaranteeing the successful execution of operations necessary in frequency resource and PRB index determination, resulting in completion of data transmission and reception without error.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

BRIEF DESCRIPTION OF DRAWINGS

The above and other aspects, features, and advantages of certain embodiments of the disclosure will be more apparent from the following description taken in conjunction with the accompanying drawings, in which:

FIGS. 7a, 7b and 7c show examples of dependent RB indexing for different SCSs according to embodiments of the disclosure;

MODE FOR THE INVENTION

Figure 1:
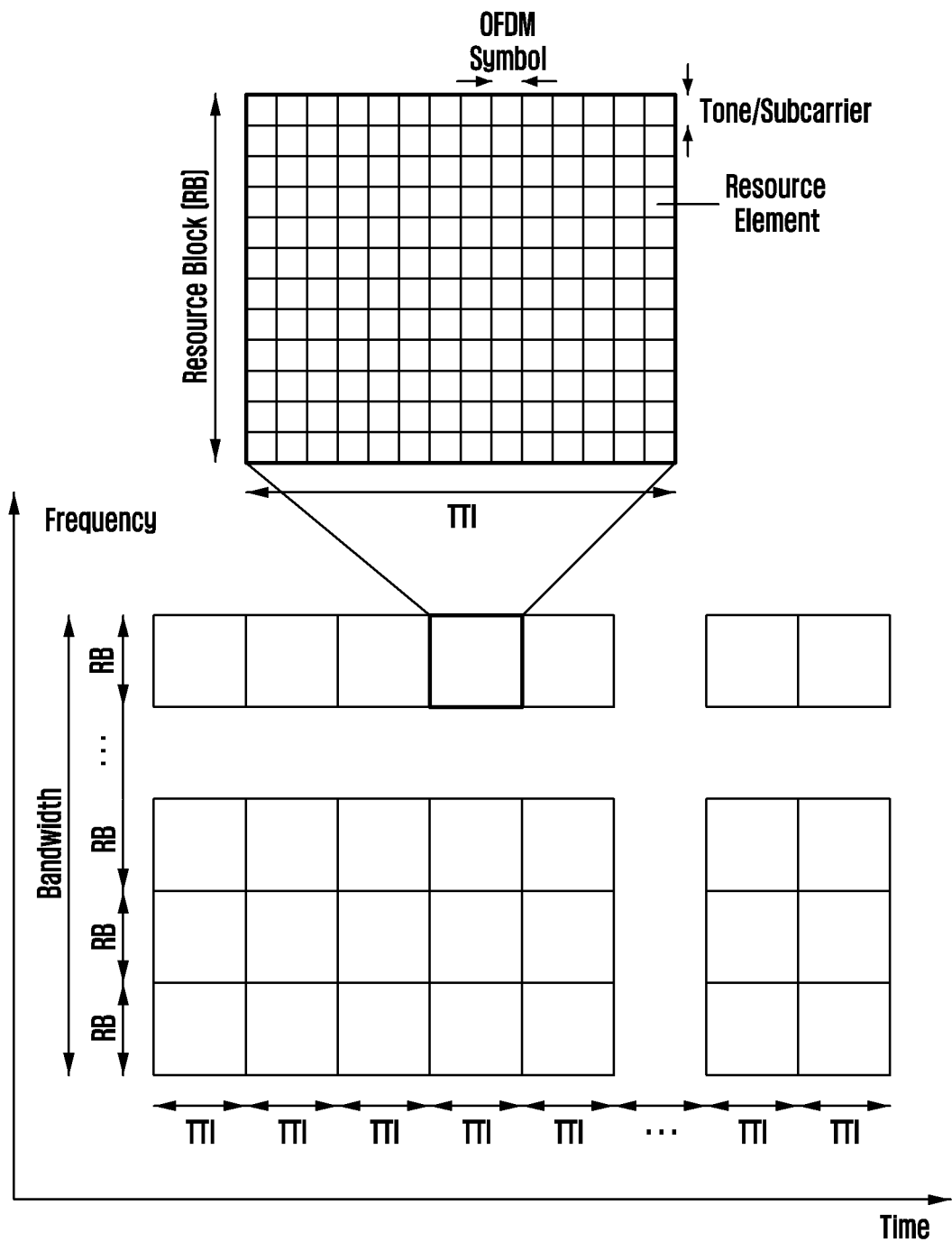
FIG. 1 shows an example of resource grid structure of an OFDM based communication system.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software.

A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), gNB or 5G NB (5GNB).

The "UE" is an entity communicating with a BS and may be referred to as UE, device, mobile station (MS), mobile equipment (ME), or terminal.

A. Basic Operation

Considering an orthogonal frequency division multiplexing (OFDM) based communication system, a resource element (RE) can be defined by a subcarrier during on OFDM symbol duration. In the time domain, a transmission time interval (TTI) or a time slot can be defined which is composed of multiple OFDM symbols. In the frequency domain, a resource block (RB) can be defined which is composed of multiple OFDM subcarriers, e.g., 12 subcarriers per RB.

FIG. 1 shows an example of resource grid structure of an OFDM based communication system.

As shown in FIG. 1, the resources can be divided into TTIs/slots in time domain and RBs in frequency domain. There can be multiple numerologies supported in the system, such as the subcarrier spacing (SCS), and cyclic prefix (CP) type, etc. As an example, a list of SCSs is shown in Table 1. Transmission with different numerologies can be multiplexed in a time division multiplexing (TDM) manner or frequency division multiplexing (FDM) manner. For example, different frequency bandwidth parts (BWPs) can be assigned for different SCSs in a semi-static manner Typically, a RB can be a base resource unit for scheduling in the frequency domain, and a TTI or a slot can be a base resource unit for scheduling in the time domain. Depending on different service features and system requirements, there can be other options.

TABLE 1

| List of supported numerologies | |
|---|---|
| Numerology Index $\mu$ | Numerology (kHz) $\Delta f_\mu = 2^\mu \cdot 15$ |
| 0 | 15 |
| 1 | 30 |
| 2 | 60 |
| 3 | 120 |
| 4 | 240 |
| 5 | 480 |

Considering that the UEs may have different bandwidth, the downlink/uplink signals and channels need to be designed to support various UEs with flexible bandwidth. The essential signals and channels can be designed based on a pre-defined bandwidth, e.g., the minimum bandwidth supported by the UEs, or the minimum bandwidth supported by the UEs targeted to a certain service.

Figure 2:
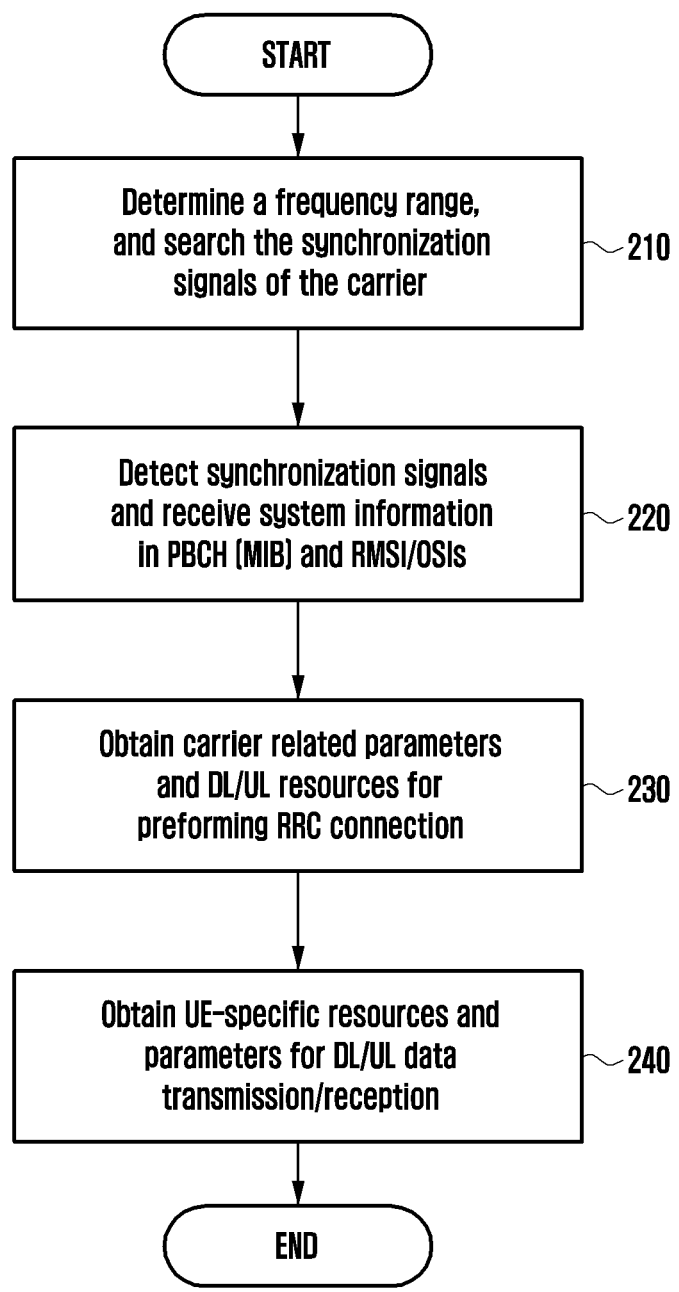
FIG. 2 shows a flowchart of UE procedure for accessing a carrier.

FIG. 2 shows a flowchart of UE procedure for accessing a carrier.

When the UE is turned on, referring to FIG. 2, the UE determines a frequency range to find the network carrier at operation 210. The presence of a carrier can be identified by detecting the corresponding synchronization signal block (SS-Block) and system information. After detecting the valid synchronization signals, the UE receives the system information, carried in the master information block (MIB), the remaining minimum system information (RMSI) and other system information (OSIs) at operation 220. Some parameters related to the current carrier can be obtained in the system information at operation 230. In addition, the downlink (DL) and uplink (UL) resources required for performing radio resource control (RRC) connection can be configured in the system information. After RRC connection, the UE-specific DL and UL resources can be configured for data transmission and receptions at operation 240.

B. Carrier Information

In a frequency band, the network (referred to as gNB in third generation partnership project (3GPP) terminology) determines the carrier location (e.g., center frequency) and carrier bandwidth (BW) based on the specification or regulations. A single carrier can be deployed, or multiple carriers can be deployed. And multiple carriers can be overlapped.

Figure 3:
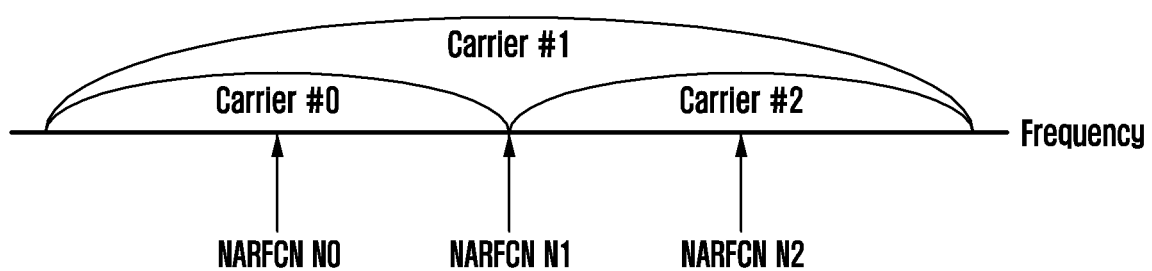
FIG. 3 shows an example of carrier deployment where multiple carriers are overlapped.

FIG. 3 shows an example of carrier deployment where multiple carriers are overlapped.

Referring to the example in FIG. 3, Carriers #0, #1 and #3 are deployed to be overlapped in a frequency domain. A set of new radio (NR) absolute radio frequency channel number (NARFCN) can be pre-defined for DL and UL, and each NARFCN is linked to a certain frequency. Referring to FIG. 3, NARFCN N1, NARFCN N2 and NARFCN N3 are pre-defined. NARFCN N1 is linked to Carrier #1, NARFCN N2 is linked to Carrier #2, and NARFCN N3 is linked to Carrier #3, respectively.

DL Carrier Information

The DL carrier information can be explicitly signaled in the system information or RRC signaling. If signaled, the following methods can be used.

[Implicit NARFCN Indication] In RMSI or OSIs, the carrier information can be signaled, such as the carrier center frequency, carrier BW, etc. The DL NARFCN index can be indicated and can be optional. The BW can be explicitly indicated. If the DL NARFCH index is not indicated, the UE can assume that the DL carrier center frequency is the same as the center frequency of the detected SS block, and hence derive DL NARFCN index based on the pre-defined linkage rule between DL NARFCN index and the center frequency values. Or, the UE may assume nothing and expect that further information can be configured later, e.g., via dedicated RRC signaling.

[Explicit NARFCN Indication] The DL NARFCN index can be explicitly indicated, since the center frequency of the detected SS block maybe not aligned with the DL carrier center frequency.

If there are multiple associated carriers, the DL NARFCN indices of all the DL carriers can be indicated. Or, the DL NARFCN index of only one carrier can be indicated, based on a pre-defined rule to determine one carrier to be indicated. For example, the DL NARFCN index of the wideband carrier can be indicated. Or, it is up to gNB to decide which carrier to be indicated. When the DL NARFCN of one or more carriers is indicated, the corresponding carrier BW can be indicated as well. The DL NARFCN and BW of some DL carrier can be indicated in dedicated RRC signaling to UE.

An example of the Long Term Evolution (LTE) evolved-universal terrestrial radio access (UTRA) absolute radio frequency channel number EARFCN is shown in Table 2. The NARFCN can be defined in a similar manner. The NARFCN can be unique in the whole frequency range, or the NARFCN can be unique in a certain frequency band or range. The NARFCH indication may mean to indicate a unique NARFCN index, or the NARFCH indication can be a combination of frequency band and NARFCN index if the NARFCN is not unique in the whole frequency range.

For example, the relationship between the frequency and NARFCN can be expressed by $$F_{Downlink} = F_{DL\_Low} + \Delta f(N_{DL} - N_{DL\_Offset})$$

$$F_{Uplink} = F_{UL\_Low} + \Delta f(N_{UL} - N_{UL\_Offset})$$

where, $N_{DL}$ is the downlink NARFCN, $N_{UL}$ is the uplink NARFCN, $N_{DL\_Offset}$ is offset used to calculate downlink NARFCN, and $N_{UL\_Offset}$ is offset used to calculate uplink NARFCN. $F_{DL\_Low}$ and $F_{UL\_Low}$ are the reference lower frequency value in the frequency band. $\Delta f$ is the channel raster size, which can be specific to the frequency range or frequency bands.

TABLE 2

E-UTRA channel numbers

| | Downlink | | | Uplink | | |
|---|---|---|---|---|---|---|
| Band | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| 27 | 852 | 9040 | 9040-9209 | 807 | 27040 | 27040-27209 |
| 28 | 758 | 9210 | 9210-9659 | 703 | 27210 | 27210-27659 |
| 29[2] | 717 | 9660 | 9660-9769 | | N/A | |
| 30 | 2350 | 9770 | 9770-9669 | 2305 | 27660 | 27660-27759 |
| 31 | 462.5 | 9870 | 9870-9919 | 452.5 | 27760 | 27760-27809 |
| 32[2] | 1452 | 9920 | 9920-10359 | | N/A | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |
| 44 | 703 | 45590 | 45590-46589 | 703 | 45590 | 45590-46589 |

NOTE 1:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.
NOTE
[2]Restricted to E-UTRA operation when carrier aggregation is configured.

[Center Frequency Offset Indication] Alternatively, the offset between the carrier center frequency and a reference frequency location can be indicated to enable UEs to derive the carrier center. For example, the reference frequency location can be the center frequency of the detected SS block, or one pre-defined boundary side of the detected SS block. The offset can be defined in terms of the carrier raster size, or in terms of the RB size with the SS-block SCS, or in terms of RB size with a certain pre-defined SCS which can be common or specific to the frequency bands. Similarly the carrier center frequency offset can be explicitly indicated and can be optional. If the offset is not indicated, the UE can assume that the DL carrier center frequency is the same as the center frequency of the detected SS block, and hence derive DL NARFCN index based on the pre-defined linkage rule between DL NARFCN index and the center frequency values. Or, the UE may assume nothing and expect that further information can be configured later, e.g., via dedicated RRC signaling.

When there are multiple associated carriers, the offset of all the DL carriers can be indicated. Or, the offset of only one carrier can be indicated, based on a pre-defined rule to determine one carrier to be indicated. For example, the offset of the wideband carrier center frequency can be indicated. In case of FIG. 3, the offset to Carrier #1 is indicated. Or, it is up to gNB to decide which carrier to be indicated. When the carrier center frequency offset of one or more carriers is indicated, the corresponding carrier BW can be indicated as well.

[DL BW] The DL carrier BW can be indicated among the possible BW candidates supported in the frequency band, e.g., {5 MHz, 10 MHz, 20 MHz, 40 MHz, 80 MHz, etc.}. Or the BW can be indicated in terms of RBs with certain reference SCS. For example, 15 kHz can be used as the reference SCS to indicate BW in terms of number of RBs. This provides good forward compatibility that new BW cases can be added in the future. Or, the reference SCS can be the one used by the SS block in the frequency band, or can be the smallest SCS supported in the system, or in the frequency band. If the DL BW is not indicated, the UE can expect a specific bandwidth part signaled from higher layers and has no assumption of the system DL BW.

Frequency Band: The frequency band index can be indicated as well, because some frequency bands may overlap and have different duplex spacing.

UL Carrier Information: The UL carrier information can be indicated as well but can be optional. Similarly, the carrier center frequency, carrier BW, etc. can be indicated. The UL carrier center frequency can be indicated in terms of the UL NARFCN. If not indicated, the default duplex spacing can be assumed by UE.

The UL carrier BW can be indicated. If not indicated, the UL carrier BW is assumed to be equal to the DL BW. The indication method can be similar as the case of DL carrier BW indication.

When there are multiple associated carriers, the UL NARFCN of all the UL carriers can be indicated. Or, the UL NARFCN of only one carrier can be indicated, corresponding to the one paired with indicated DL carrier. Or, the UL NARFCN corresponding to the wide carrier can be indicated. The UL NARFCN and BW of some UL carrier can be indicated in dedicated RRC signaling to UE.

Secondary Carrier Information

The gNB can configure UEs to add a secondary carrier, where the secondary carrier information can be explicitly configured in the UE-specific RRC signaling. A secondary cell may be associated with an index, e.g., range from 0 to 7 by 3 bits indication. The secondary cell can be linked to its index by specifying its carrier location information, and/or the physical cell ID if present. The carrier location can be specified by a reference NARFCN of the corresponding secondary carrier. The reference NARFCN can be the NARFCN in the carrier center or close to the carrier center, or a certain NARFCN within the carrier, e.g., the one close to the lowest frequency side of the carrier. The index of NARFCN can be explicitly indicated. If the NARFCN corresponds to the carrier center, the BW can be indicated together to obtain carrier information. Or, the relative location information of the NARFCN in the carrier can be indicated.

C. Common RB Index Information

A common PRB index can be used in a certain carrier, or shared by multiple carriers if overlapping. The common PRB indexing can be used for generation of reference signal (RS) sequences if shared by multiple carriers.

Figure 4:
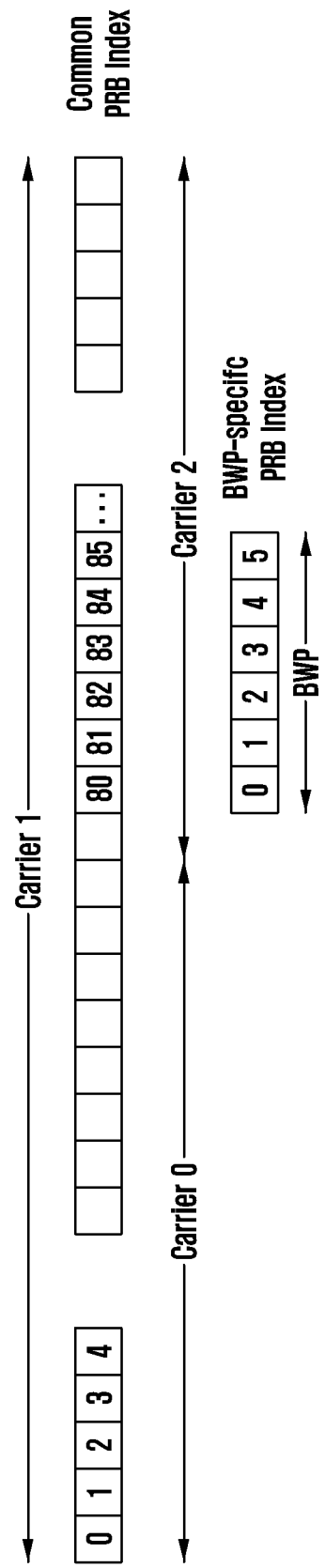
FIG. 4 shows an example of common physical resource block (PRB) index and BWP-specific PRB index according to an embodiment of the disclosure.

FIG. 4 shows an example of common physical resource block (PRB) index and BWP-specific PRB index according to an embodiment of the disclosure.

As shown in FIG. 4, there can be a common PRB index shared by all the overlapping carriers operated by the gNB in a frequency band. When a BWP in a carrier is configured to a UE, a local PRB indexing (i.e., BWP-specific PRB index) can be used within the configured BWP.

Given that the UE obtains information of carrier center and BW after receiving system information, the RB structure of different subcarrier spacing can be derived based on a pre-defined rule. For example, the maximum integer number of RBs in the given BW can be considered to support forward compatibility.

Figure 5:
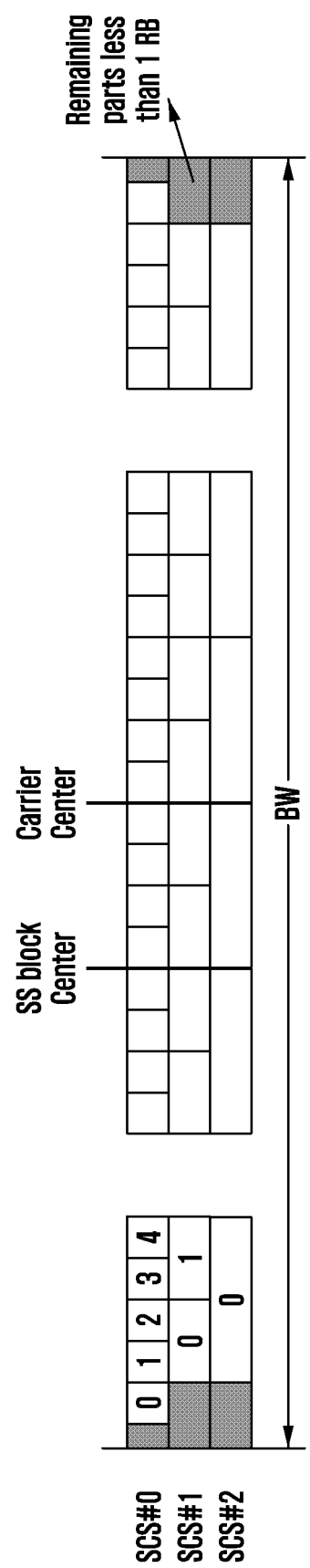
FIG. 5 shows an example of RB structure and scaled indexing in a given carrier BW according to an embodiment of the disclosure.

FIG. 5 shows an example of RB structure and scaled indexing in a given carrier BW according to an embodiment of the disclosure.

As shown in FIG. 5, the RBs of different SCS can be aligned with the carrier center frequency and mapped sequential within the carrier, unless the remaining frequency resource in each edge side is less than the BW of one RB with the corresponding SCS. The RB can be indexed from a certain reference point, e.g., the carrier edge (lower frequency side or higher frequency side), or the carrier center, or the SS block center. To inform the common RB index to UEs, the RB index of a certain reference RB or reference location can be indicated, e.g., in MIB and/or RMSI and/or UE-specific RRC signaling. Based on the indicated RB index and pre-defined indexing rule, the common RB index of RBs in the full carrier can be derived. For the DL common RB index and UL common RB index cases, various methods can be considered.

DL Carrier Case

Carrier Edge Originated Indexing

Referring to FIG. 5, the RBs are sequentially indexed based on the lower frequency side, e.g., denoted by carrier edge originated RB indexing. For a certain SCS, the first RB index is 0 and then the RBs are sequentially indexed till to the higher frequency side.

Figure 6A:
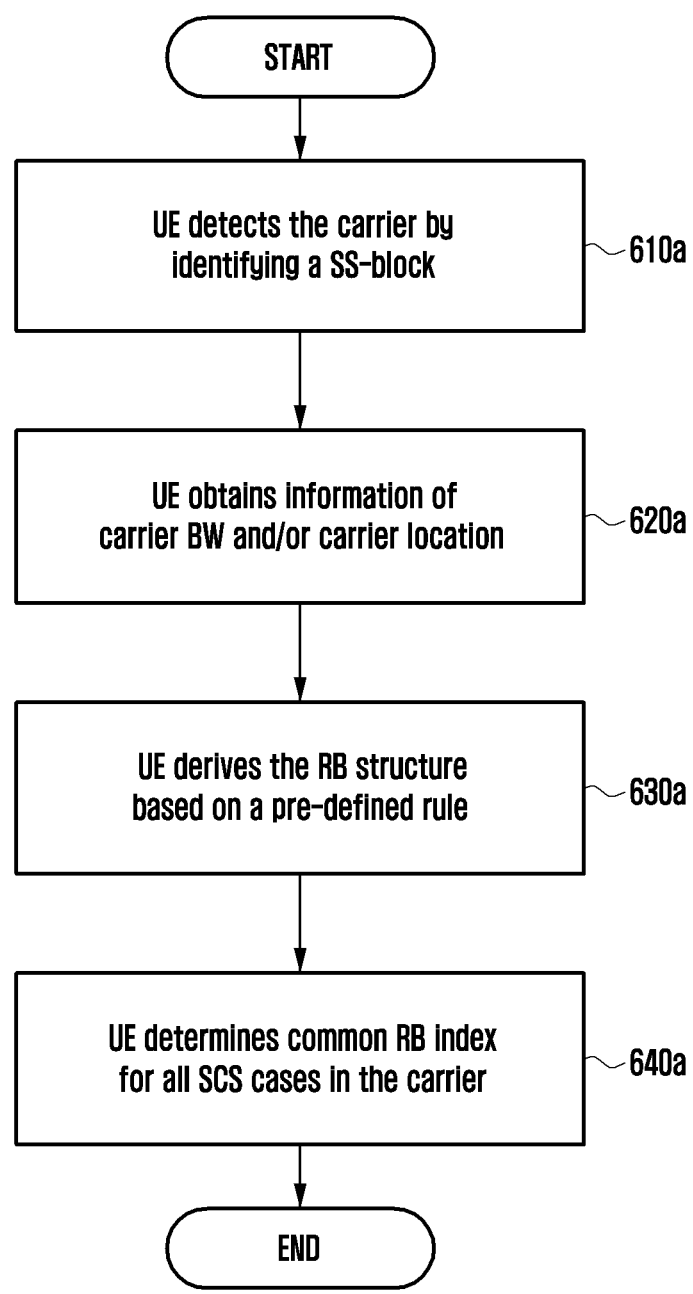
FIGS. 6a and 6b show UE procedures to obtain common PRB index according to embodiments of the disclosure.
Figure 6B:
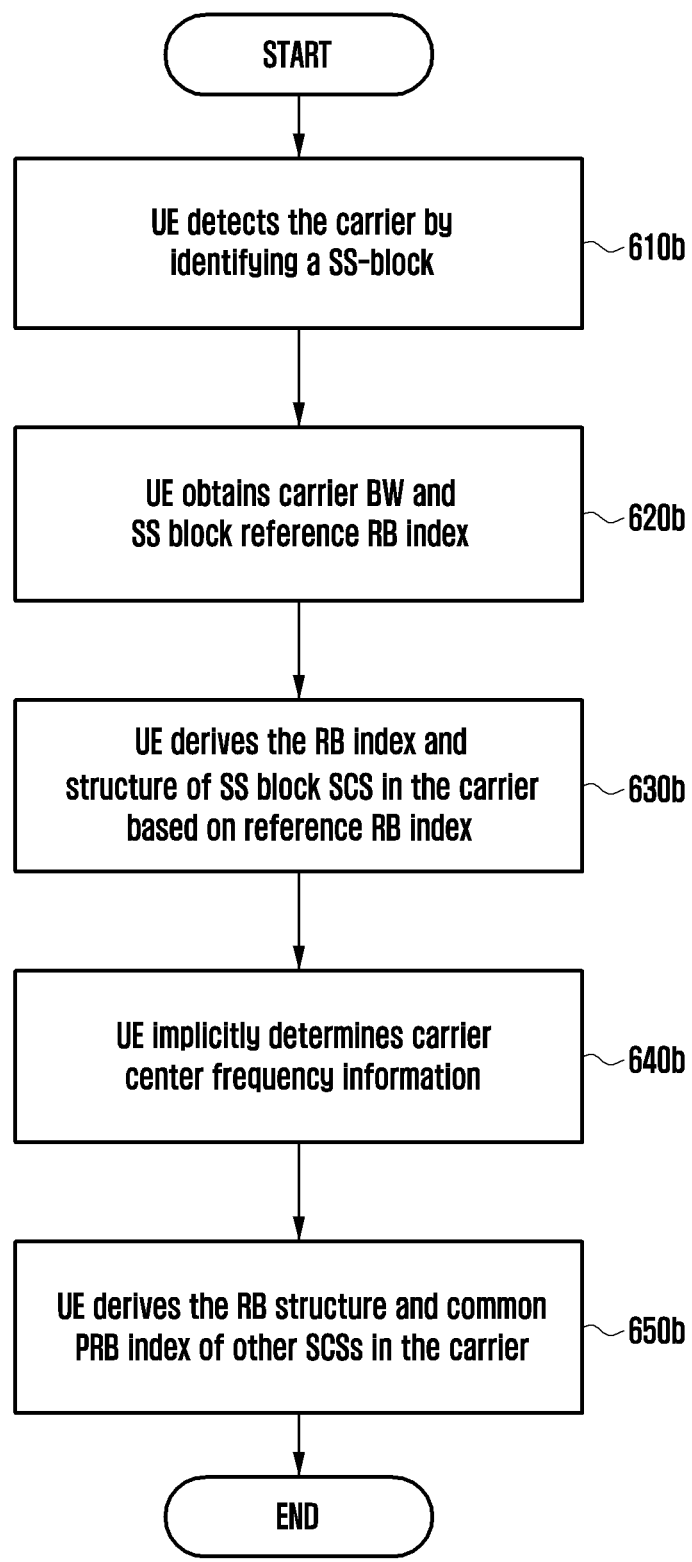

FIGS. 6a and 6b show UE procedures to obtain common PRB index according to embodiments of the disclosure.

Specifically, FIG. 6a shows a UE procedure in the case where information of carrier center is available. Referring to FIG. 6a, the UE detects the carrier by identifying a SS-block at operation 610a. The UE obtains information of carrier center at operation 620a. If the information of carrier center is available, e.g., DL NARFCN, carrier BW and carrier location is known, the UE can derive the RB structure, i.e., the frequency resources occupied by the carrier at operation 630a, and hence derive the RB index for each possible SCS at operation 640a, based on a pre-defined RB grid rule.

FIG. 6b shows a UE procedure in the case where the information of carrier center is not available. Referring to FIG. 6b, the UE detects the carrier by identifying a SS-block at operation 610b. The UE obtains carrier BW and a reference RB index of the SS-block at operation 620b. If the information of carrier center is not available, one reference RB index of the SS block can be indicated to enable UE obtain RB indexing in the whole carrier. For example, the reference RB can be the one closest to the center frequency of the SS block or the RB in one edge side of the SS block. The UE derives the RB index and structure of SS block SCS in the carrier based on the reference RB index at operation 630b. Based on the indicated reference RB index and derived RB structure in the carrier, the RB index in the whole carrier can be derived if the carrier BW information is available. After that, the UE implicitly determines carrier center frequency information at operation 640b. The UE derives the RB structure and common PRB index of other SCSs in the carrier at operation 650b. The carrier center and RB index for other SCSs can be derived based on a pre-defined RB grid rule.

If the RB grid relationship among different SCSs is not available, e.g., the UE may not know the relative positions of RB grid for different SCSs. The relationship of RB grid among different SCSs can be further indicated. For example, given a lowest subcarrier spacing SCS #0 in the frequency range and another higher subcarrier spacing SCS #1, the offset between PRB0 with subcarrier spacing SCS #0 and PRB0 with subcarrier spacing SCS #1 can be indicated, e.g., in terms of number of RBs with subcarrier spacing SCS #0. For all the supported subcarrier spacing in the frequency range, the offsets between PRB0 with subcarrier spacing SCS #0 and PRB0 with other SCSs can be indicated separately. For example in FIG. 5, the lowest subcarrier spacing is SCS #0. It is possible that the PRB0 of SCS #0 may not be aligned with the PRB0 of higher SCSs, e.g., SCS #1 and SCS #2. For SCS #1, it can be indicated that there is an offset of 1 RB with SCS #0, between the PRB0 with SCS #0 and PRB0 with spacing SCS #1. For SCS #2, it can be indicated that there is an offset of 1 RB with SCS #0, between the PRB0 with SCS #0 and PRB0 with spacing SCS #2. So the UE can know the RB grid relationship among the supported SCSs, i.e., SCS #0, SCS #1, and SCS #2. In some case, if not indicated, it can be assumed that the PRB with subcarrier spacing SCS #0 and PRB0 with the subcarrier spacing is aligned, e.g., from the lower frequency side. Several bits can be used to indicate the possible offset, e.g., 2 bits to indicate up to 4 possibilities, or 3 bits to indicate up to 8 possibilities. Based on the offset information of the RB grid of different subcarrier spacing, the RB grid or the RB boundary alignment in the whole carrier can be derived. Then, based on the indicated index of SS block reference RB (e.g., the one in the lowest frequency edge side) and derived RB structure in the carrier, the RB index in the whole carrier can be derived.

In one case, the SS block may be always aligned with the actual RB grid of the system. For example, a SS block is composed of 24 RBs given certain subcarrier spacing. The 24 RBs are exactly aligned with the grid of 24 RBs of the given subcarrier spacing in the carrier(s).

Figure 6C:
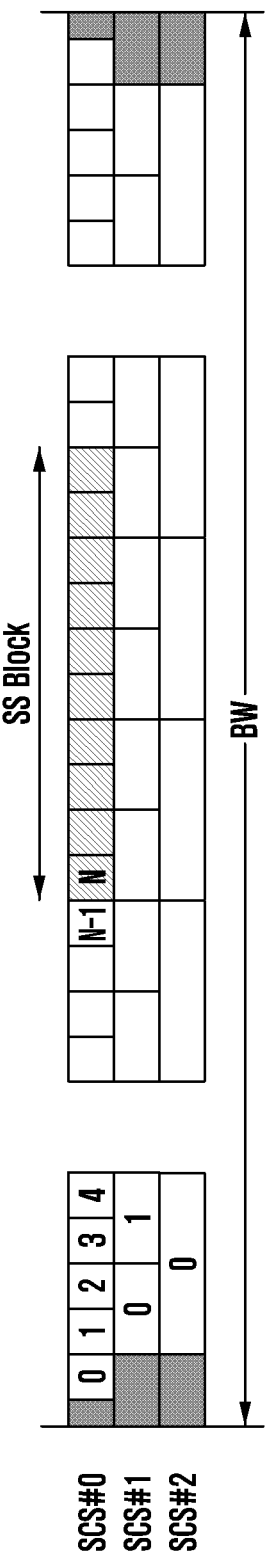
FIG. 6c shows an example of aligned RB grid between SS block and system RB grid according to an embodiment of the disclosure.

FIG. 6c shows an example of aligned RB grid between SS block and system RB grid according to an embodiment of the disclosure.

Referring to the example in FIG. 6c, the SS block RB in the lower frequency edge side is aligned with the RB with index N in the system. By indicating the RB index N for the SS block RB in the lower frequency side, the SS block location in the system carrier and the corresponding common RB index in the whole carrier can be derived. By applying the RB grid relationship among different SCSs, the common RB index of other subcarrier spacing cases can be derived as well.

In another case, the SS block may not always align with the actual RB grid of the system. For example, a SS block is composed of 24 RBs given certain subcarrier spacing. The 24 RBs are not aligned with the grid of 24 RBs of the given subcarrier spacing in the carrier(s), but with some offset.

Figure 6D:
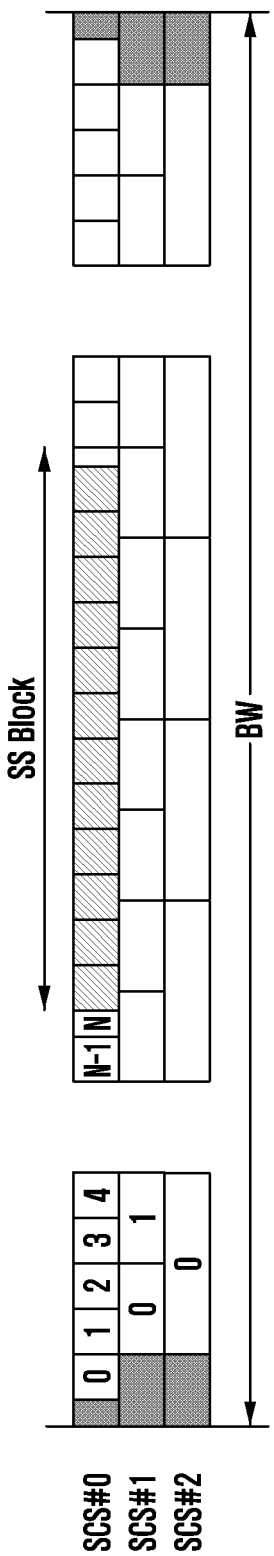
FIGS. 6d and 6e show an example of unaligned RB grid between SS block and system RB grid according to an embodiment of the disclosure.
Figure 6E:
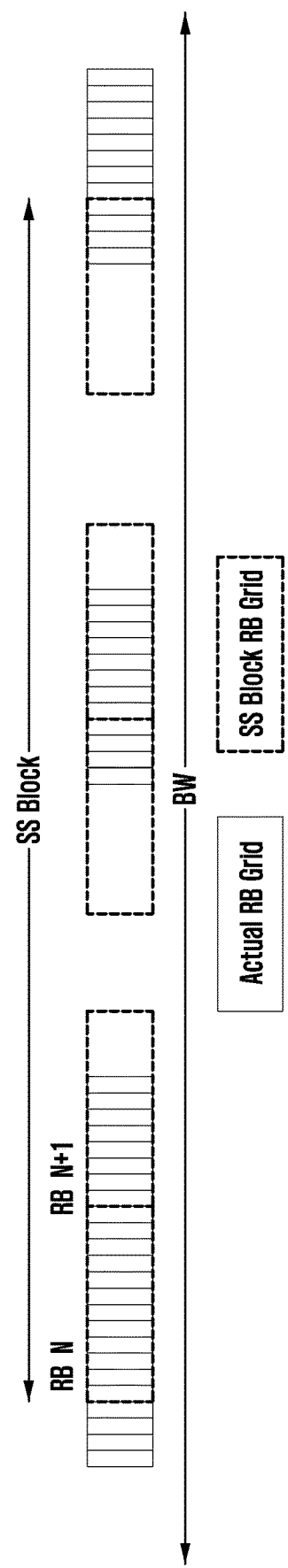

FIGS. 6d and 6e show an example of unaligned RB grid between SS block and system RB grid according to an embodiment of the disclosure.

Referring to the example in FIG. 6d, the SS block RB in the lower frequency edge side is partially aligned with the RB with index N in the system. By indicate the index N for the SS block RB in the lower frequency edge side, the SS block location the system carrier and the corresponding common RB index in the whole carrier cannot be fully derived. This requires additional indication of offset between SS block RB grid and actual system grid. A more detailed example is shown in FIG. 6e. The SS block RB in the lower frequency edge side overlap partially with the RB N and RB (N+1) in the system, e.g., 8 subcarrier in RB N, and 4 subcarriers in RB (N+1). The subcarrier level offset can be indicated to derive the difference between the actual RB gird and SS Block RB grid. For example, the subcarrier offset between the lowest subcarrier in the SS block and the lowest subcarrier of the overlapped RB can be indicated, e.g., 4 in the example in FIG. 6e. It can be interpreted as the actual subcarrier index of the lowest subcarrier in the SS block, when indexed in the actual system RB grid in a certain RB. Given 12 subcarriers per RB, the offset can be indicated by 4 bits. This indication can be signaled in the MIB or RMSI, to enable UE obtain the RB grid as early as possible. The RB index can be indicated in the RMSI. By combining both indications, the UE can derive the actual RB grid and the corresponding common RB index in the system carrier.

So, in above approaches, the RB grid relationship among different subcarrier spacing can be pre-defined or derived based on the carrier information or BW information if available. If not available, the information of the RB grid relationship among different subcarrier spacing (e.g., the offset between PRB0 of different SCSs) can be indicated to allow UE to derive the RB grid relationship. The SS block RB grid and actual system RB grid can be fixed based on a pre-defined rule or can be indicated, e.g., in terms of subcarrier offset. Then, based on the indicated RB index of the SS block reference RB, the common RB index of all subcarrier spacing in the whole carrier can be derived.

The indication of RB grid relationship, and/or RB index of the SS block reference RB, and subcarrier offset between SS block RB grid and system RB grid can be in MIB and/or RMSI. For example, the subcarrier offset between SS block RB grid and system RB grid can be in MIB, and the RB grid relationship, and/or RB index of the SS block reference RB can be in RMSI. Based on the combined indications, the common RB index of all subcarrier spacing in the whole carrier can be derived.

Figure 6F:
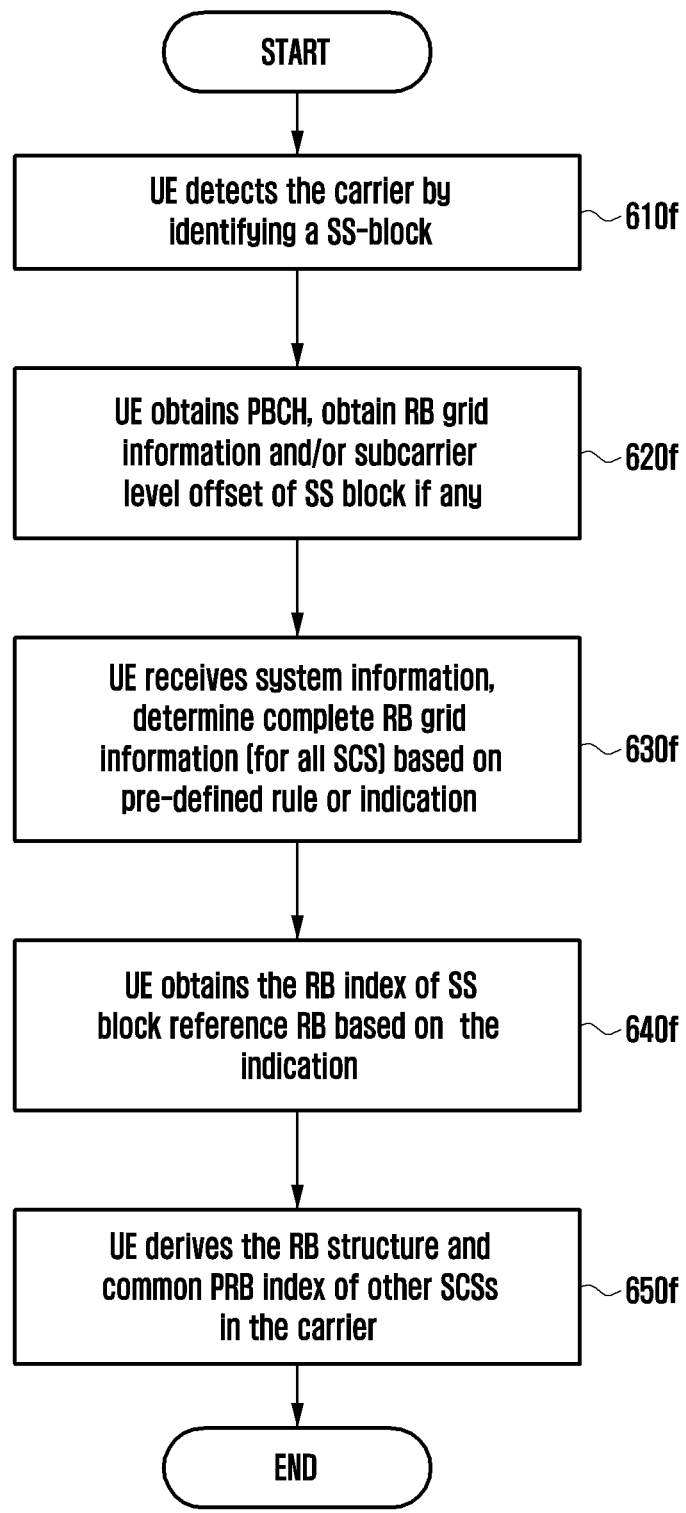
FIG. 6f shows the UE procedure to obtain common RB index according to an embodiment of the disclosure.

FIG. 6f shows the UE procedure to obtain common RB index according to an embodiment of the disclosure.

Referring to FIG. 6f, a UE detects the carrier by identifying a SS-block 610f. The UE obtains PBCH to obtain RB grid information and/or subcarrier level offset of SS block, if any, at operation 620f. The UE receives system information to determine complete RB grid information (for all SCS) based on pre-defined rule or indication at operation 630f. The UE obtains the RB index of SS block reference RB based on the indication at operation 640f. The UE derives the RB structure and common PRB index of other SCSs in the carrier at operation 650f.

FIGS. 7a, 7b and 7c show examples of dependent RB indexing for different SCSs.

To allow efficient RB indexing for multiple SCSs, the RBs for different SCSs can be indexed dependently. Considering the nested RB structure, one RB with larger subcarrier spacing is always aligned with multiple RBs of smaller subcarrier spacing.

Given two subcarrier spacing $\Delta f_0 = 2^{\mu_0} \cdot 15$ and $\Delta f_1 = 2^{\mu_1} \cdot 15$ ($\mu_0 < \mu_1$), the nested RB structure and RB indexing satisfy a certain pre-defined rule. For example, if $\Delta f_1 = k \Delta f_0$, one RB with subcarrier spacing $\Delta f_1$ is aligned with k RBs with subcarrier spacing $\Delta f_0$. Assuming certain k RBs with SCS $\Delta f_0$ which align with one RB with SCS $\Delta f_1$, the k RBs with SCS $\Delta f_0$ have the RB index {n, n+1, n+2, . . . , n+k−1}, and the one RB with SCS $\Delta f_1$ has an index m. One rule can be mod(n,k)=0. In this case, given a certain RB index with a certain SCS, at least the RB structure of other SCSs can be obtained based on the index alignment rule. This is shown in the example of FIG. 7a.

In this case, if a certain RB index (e.g., n) with a given SCS $f$ (e.g., a SS block SCS) is known, it can be determined that there can be one of the following two cases for the RB with larger SCS 2f:

The RB $\lfloor m/2 \rfloor$ with larger SCS 2f is nested with RB n and RB n+1 with SCS $f$, if mod(n,2)=0. The index m is not available, and need additional indication to obtain it.

The RB $\lfloor m/2 \rfloor$ with larger SCS 2f is nested with RB n−1 and RB n with SCS $f$, if mod (n,2)=1. The index m is not available, and need additional indication to obtain it.

Similarly, if a certain RB index (e.g., n) with a given SCS $f$ (e.g., a SS block SCS) is known, it can be determined that for the RB with smaller SCS $$\frac{f}{2}:$$

The RB n with SCS $f$ is nested with RB 2m RB 2m+1 with SCS $$\frac{f}{2}.$$

The index m is not available, and need additional indication to obtain it.

In this way, the RB structure of all the SCSs can be derived based on one known RB index in a certain SCS, but the exact RB index is not available.

Another rule can be n=mk, which enable a UE to derive the RB index of all SCSs if knowing a certain RB index with a certain SCS. This is shown in the example of FIG. 7b, which can be denoted as a scaled indexing method.

In this case, if a certain RB index (e.g., n) with a given SCS $f$ (e.g., a SS block SCS) is known, it can be determined that there can be one of the following two cases for the RB with larger SCS 2f:

The RB $\lfloor n/2 \rfloor$ with larger SCS 2f is nested with RB n and RB n+1 with SCS $f$, if mod(n,2)=0.

The RB $\lfloor n/2 \rfloor$ with larger SCS 2f is nested with RB n−1 and RB n with SCS $f$, if mod(n,2)=1.

Similarly, if a certain RB index (e.g., n) with a given SCS $f$ (e.g., a SS block SCS) is known, it can be determined that for the RB with smaller SCS $$\frac{f}{2}:$$

The RB n with SCS $f$ is nested with RB 2n and RB 2n+1 with SCS $$\frac{f}{2}$$

In this way, the RB structure and RB index of all the SCSs can be derived based on one known RB index in a certain SCS.

In both cases in FIGS. 7a and 7b, the RB index can be restricted to non-negative integers, i.e., starting from 0. Or, the non-negative integers can be used as RB index as well.

Another example is shown in FIG. 7c, where there is a center point to align the RB boundary, e.g., a carrier center. In one side, e.g., higher frequency side, the RBs are sequentially indexed by the even numbers from the center point, i.e., {0, 2, 4, . . . , 2n, 2n+2, . . . }. In another side, e.g., lower frequency side, the RBs are sequentially indexed by the odd numbers from the center point, {1, 3, 5, . . . , 2m+1, 2m+3, . . . }. So in the higher frequency side with even number indexing, the integer n starts from 0 and sequentially increasing, till to the carrier higher edge side. Similarly, in the lower frequency side with odd number indexing, the integer m starts from 0 and sequentially increasing, till to the carrier lower edge side. Again, for the nested RBs with different SCS, the RB index can be derived by knowing any one RB index of any SCS. This can be used in case that the RB boundary is aligned with the carrier center and provide good forward compatibility since there is possibility to extend the RB usage in the carrier edge side.

In this case, if a certain RB index (e.g., n) with a given SCS $f$ (e.g., a SS block SCS) is known, it can be determined that there can be one of the following four cases for the RB with larger SCS 2f:

The RB $$2\lfloor \frac{n}{4} \rfloor$$

with larger SCS 2f is nested with RB n and RB n+2 with SCS $f$, if mod(n,2)=0 and $$\mathrm{mod}\left(\frac{n}{2}, 2\right) = 0.$$

The RB $$2\left\lfloor \frac{n}{4} \right\rfloor$$

with larger SCS $2f$ is nested with RB n−2 and RB n with SCS $f$, if mod(n,2)=0 and $$\mathrm{mod}\left(\frac{n}{2}, 2\right) = 1.$$

The RB $$2\left\lfloor \frac{n}{4} \right\rfloor + 1$$

with larger SCS $2f$ is nested with RB n−2 and RB n with SCS $f$, if mod(n,2)=1 and $$\mathrm{mod}\left(\frac{n}{2}, 2\right) = 0.$$

The RB $$2\left\lfloor \frac{n}{4} \right\rfloor + 1$$

with larger SCS $2f$ is nested with RB n and RB n+2 with SCS $f$, if mod(n,2)=1 and $$\mathrm{mod}\left(\frac{n}{2}, 2\right) = 1$$

Similarly, if a certain RB index (e.g., n) with a given SCS $f$ (e.g., a SS block SCS) is known, it can be determined that there can be one of the following two cases for the RB with smaller SCS $$\frac{f}{2}:$$

The RB n with SCS $f$ is nested with RB 2n and RB 2n+2 with SCS $$\frac{f}{2},$$

if mod(n,2)=0.
The RB with SCS $f$ is nested with RB 2n+1 and RB 2n−1 with SCS $$\frac{f}{2},$$

if mod(n,2)=1.
In this way, the RB index of all the SCSs can be derived based on one known RB index in a certain SCS.

To reduce signaling overhead since the RB index may be indicated in some cases. The RBs can be cyclically indexed with a certain cycle, which means a maximum number of RB index is used in a certain SCS. The maximum number of RB index can be different for different SCS, if the cycle is based on the same amount frequency resources.

Figure 8:
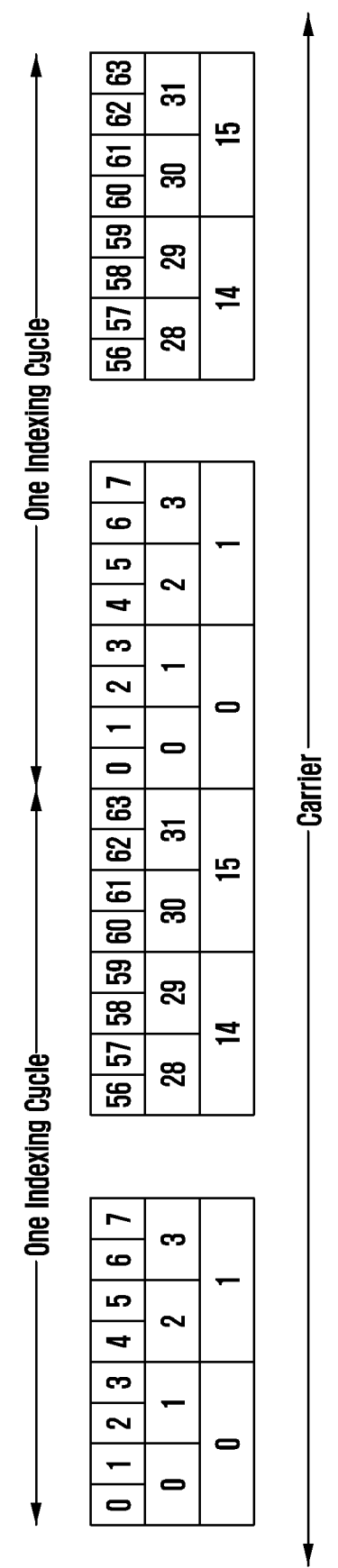
FIG. 8 shows examples of cyclic RB indexing according to an embodiment of the disclosure.

FIG. 8 shows examples of cyclic RB indexing according to an embodiment of the disclosure.

As shown in FIG. 8, for a certain SCS i, there is a maximum number of RB index, e.g., $N_i$ which is cyclically used. The RB index in a cycle can be determined based on a certain predefined rule, e.g., from 0 to $N_i$−1, or from $$-\frac{N_i}{2} \text{ to } \frac{N_i}{2} - 1.$$

The value $N_i$ can be pre-defined based on a certain SCS i, e.g., a smallest SCS in the frequency band. The values of other SCSs can be determined based on the difference with SCS i. The cyclic indexing can be jointly used with the one of the scaled indexing cases list in FIG. 6.

Figure 9:
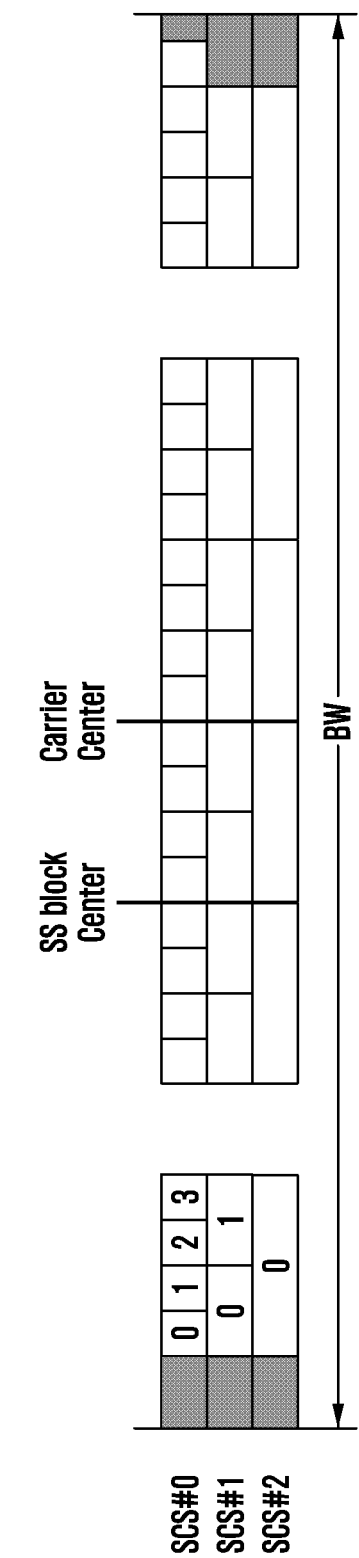
FIG. 9 shows an example of carrier edge originated RB indexing based on the scaled RB indexing according to an embodiment of the disclosure.

FIG. 9 shows an example of carrier edge originated RB indexing based on the scaled RB indexing according to an embodiment of the disclosure. This is applicable when the RB boundary with different SCS is aligned with the one frequency edge side. However, it is observed that due to the RB alignment in the edge, the largest RB case may need to be considered for alignment, and may result resource waste.

When the scaled RB indexing is aligned from the lower frequency edge side, it is still possible that the SS block may align or not align with the actual RB grid of the system. For example, a SS block is composed of 24 RBs given certain subcarrier spacing. The 24 RBs are exactly aligned with the grid of 24 RBs of the given subcarrier spacing in the carrier(s). The SS block RB in the lower frequency edge side is aligned with the RB with index N in the system. By indicating the RB index N for the SS block RB in the lower frequency side, the SS block location in the system carrier and the corresponding common RB index in the whole carrier can be derived. By applying the relationship of scaled RB index among different SCSs, the common RB index of other subcarrier spacing cases can be derived as well.

In another case, the SS block may not always align with the actual RB grid of the system. For example, a SS block is composed of 24 RBs given certain subcarrier spacing. The 24 RBs are not aligned with the grid of 24 RBs of the given subcarrier spacing in the carrier(s), but with some offset. The SS block RB in the lower frequency edge side is partially aligned with the RB with index N in the system. By indicate the index N for the SS block RB in the lower frequency edge side, the SS block location the system carrier and the corresponding common RB index in the whole carrier cannot be fully derived. This requires additional indication of offset between SS block RB grid and actual system grid. The SS block RB in the lower frequency edge side overlap partially with the RB N and RB (N+1) in the system, e.g., 8 subcarrier in RB N, and 4 subcarriers in RB (N+1). The subcarrier level offset can be indicated to derive the difference between the actual RB gird and SS Block RB grid. For example, the subcarrier offset between the lowest subcarrier in the SS block and the lowest subcarrier of the overlapped RB can be indicated, e.g., 4 in the example. It can be interpreted as the actual subcarrier index of the lowest subcarrier in the SS block, when indexed in the actual system RB grid in a certain RB. Given 12 subcarriers per RB, the offset can be indicated by 4 bits. This indication can be signaled in the MIB or RMSI, to enable UE obtain the RB gird as early as possible. The RB index can be indicated in the RMSI. By combining both indications, the UE can derive the actual RB grid and the corresponding common RB index in the system carrier.

So, in above case with aligned PRB0 boundary of different subcarrier spacing, the RB grid relationship of different subcarrier spacing can be implicitly derived. The SS block RB grid and actual system RB grid can be fixed based on a pre-defined rule or can be indicated, e.g., in terms of subcarrier offset. Then, based on the indicated RB index of the SS block reference RB, the common RB index of all subcarrier spacing in the whole carrier can be derived.

The indication of RB index of the SS block reference RB, and subcarrier offset between SS block RB grid and system RB grid can be in MIB and/or RMSI. For example, the subcarrier offset between SS block RB grid and system RB grid can be in MIB, and the RB grid relationship, and/or RB index of the SS block reference RB can be in RMSI. Based on the combined indications, which provides an offset of SS block reference PRB and PRB0 with the SS block numerology, the common RB index of all subcarrier spacing in the whole carrier can be derived.

Figure 10:
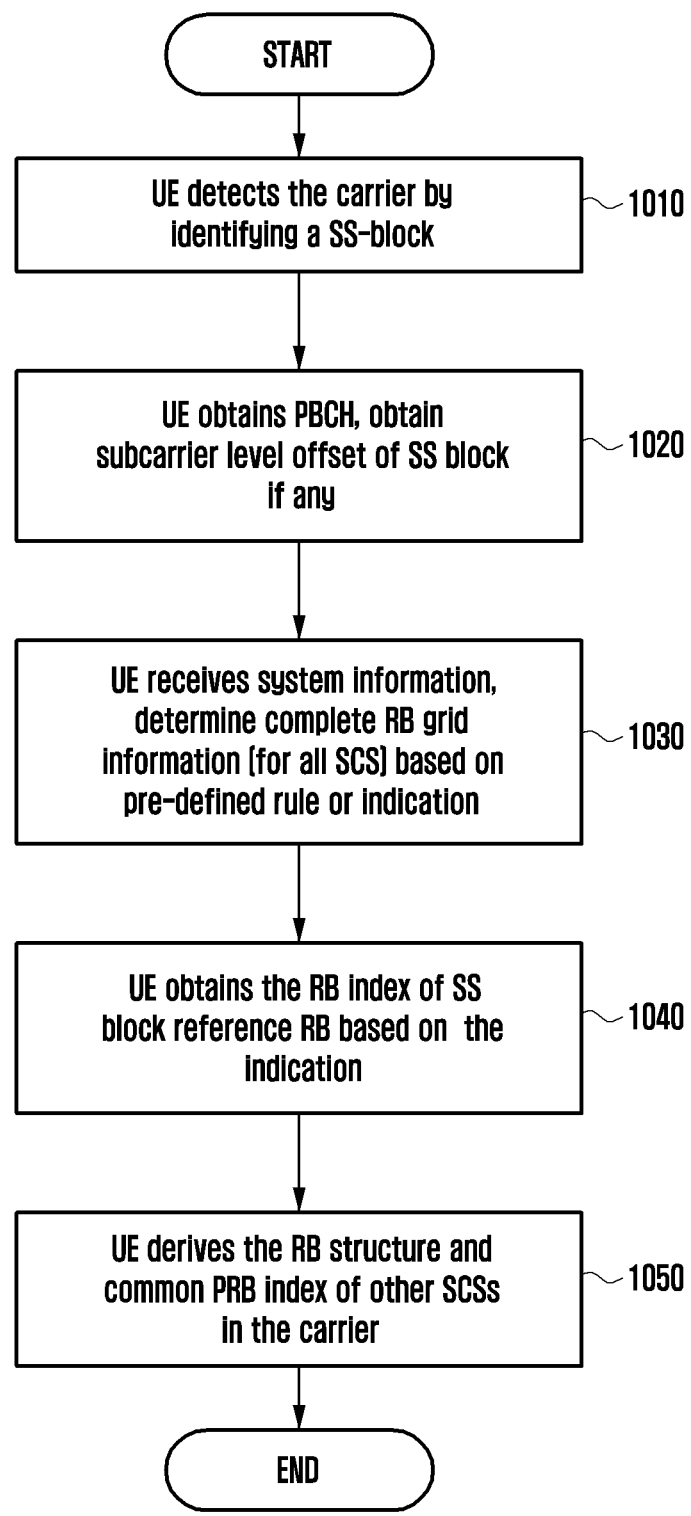
FIG. 10 shows the UE procedure to obtain common RB index according to an embodiment of the disclosure.

FIG. 10 shows the UE procedure to obtain common RB index according to an embodiment of the disclosure.

Referring to FIG. 10, UE detects the carrier by identifying a SS-block at operation 1010. The UE obtains PBCH to obtain subcarrier level offset of SS block, if any, at operation 1020. The UE receives system information to determine complete RB grid information (for all SCS) based on pre-defined rule or indication at operation 1030. The UE obtains the RB index of SS block reference RB based on the indication at operation 1040. The UE derives the RB structure and common PRB index of other SCSs in the carrier at operation 1050.

Carrier Center Originated Indexing

Figure 11:
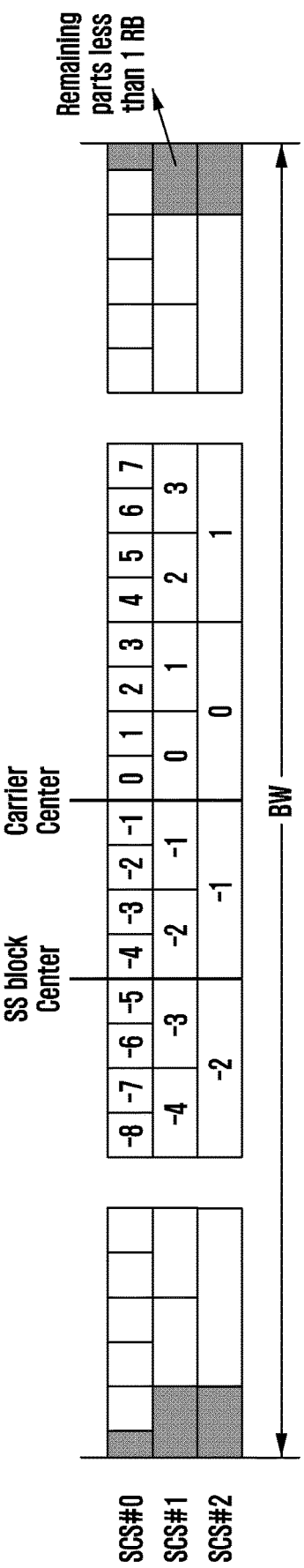
FIGS. 11 and 12 show examples of RB structure and indexing in a given carrier BW according to embodiments of the disclosure.
Figure 12:
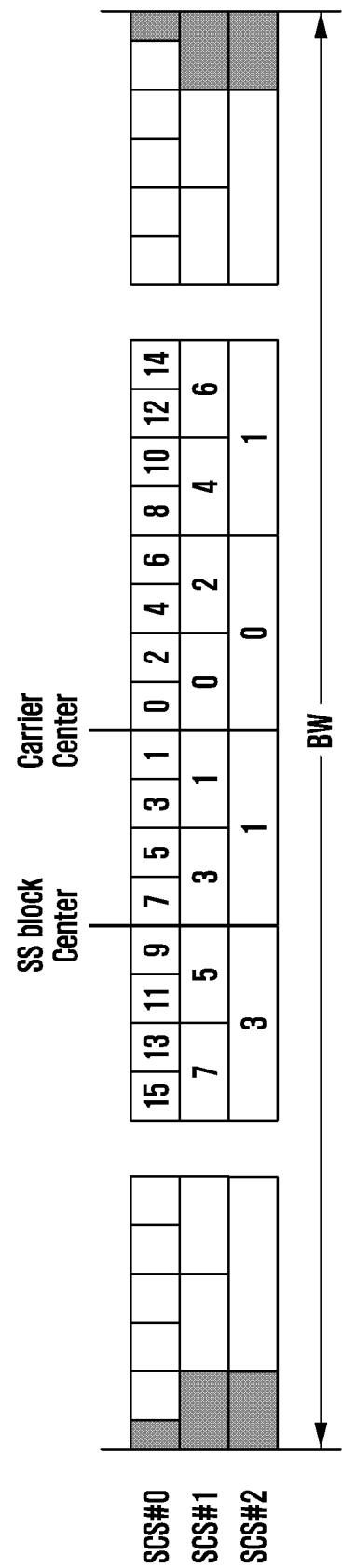

FIGS. 11 and 12 show examples of RB structure and indexing in a given carrier BW according to embodiments of the disclosure.

Referring to FIG. 11, RBs are sequentially and/or cyclically indexed with scaled indexing method based on one reference RB closest to the carrier center frequency, e.g., denoted by carrier center originated indexing. For example, the reference RB of a certain SCS can be the RB in the higher frequency side which aligns with the carrier center frequency. This makes a symmetric RB structure around the carrier center frequency. For example, the index of the reference RB is 0 and then the RBs are sequentially indexed to both frequency sides. This is applicable when the RB boundary with different SCS is aligned with the carrier center frequency.

Referring to FIG. 12, the RBs are sequentially and/or cyclically indexed with scaled indexing method based on one reference RB closest to the carrier center frequency. In the higher frequency side, the RBs are indexed by even numbers sequentially and/or cyclically. In the lower frequency side, the RBs are indexed by odd numbers sequentially and/or cyclically. This has good forward compatibility in case that the usage of RBs in the carrier edge side is extendable.

Figure 13A:
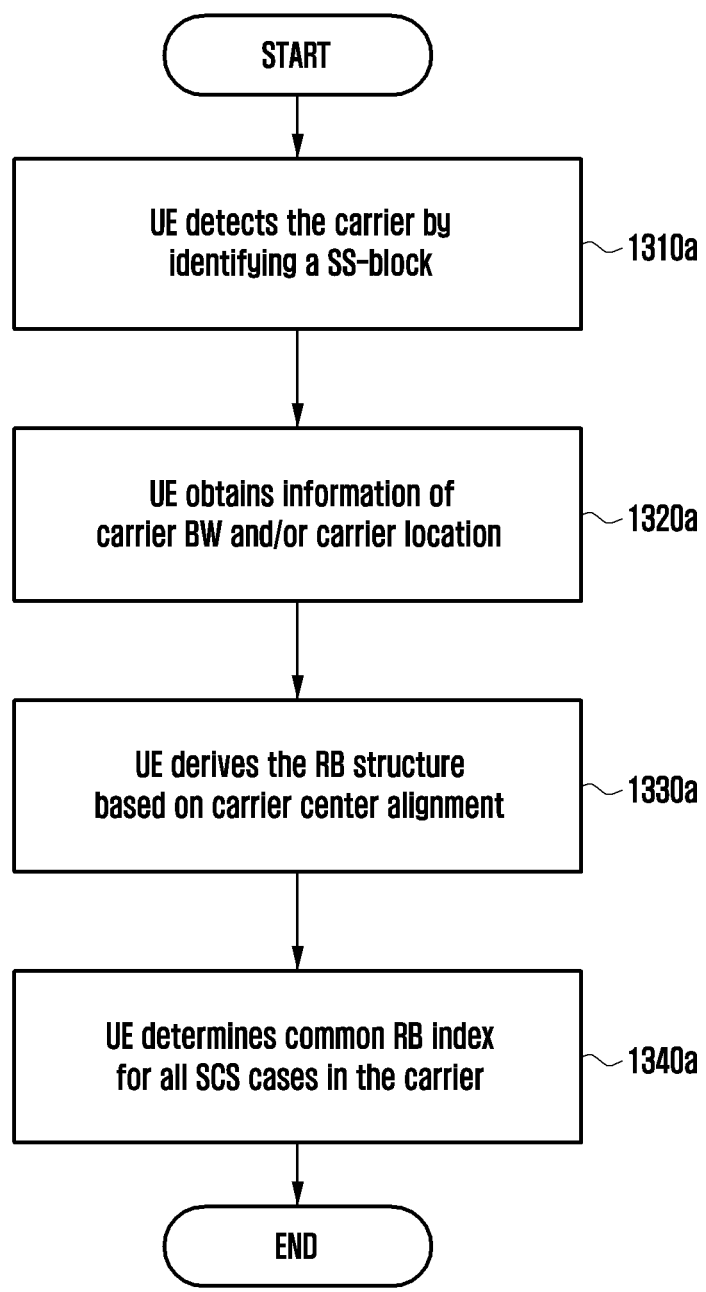
FIGS. 13a and 13b show UE procedures to obtain common PRB index according to embodiments of the disclosure.
Figure 13B:
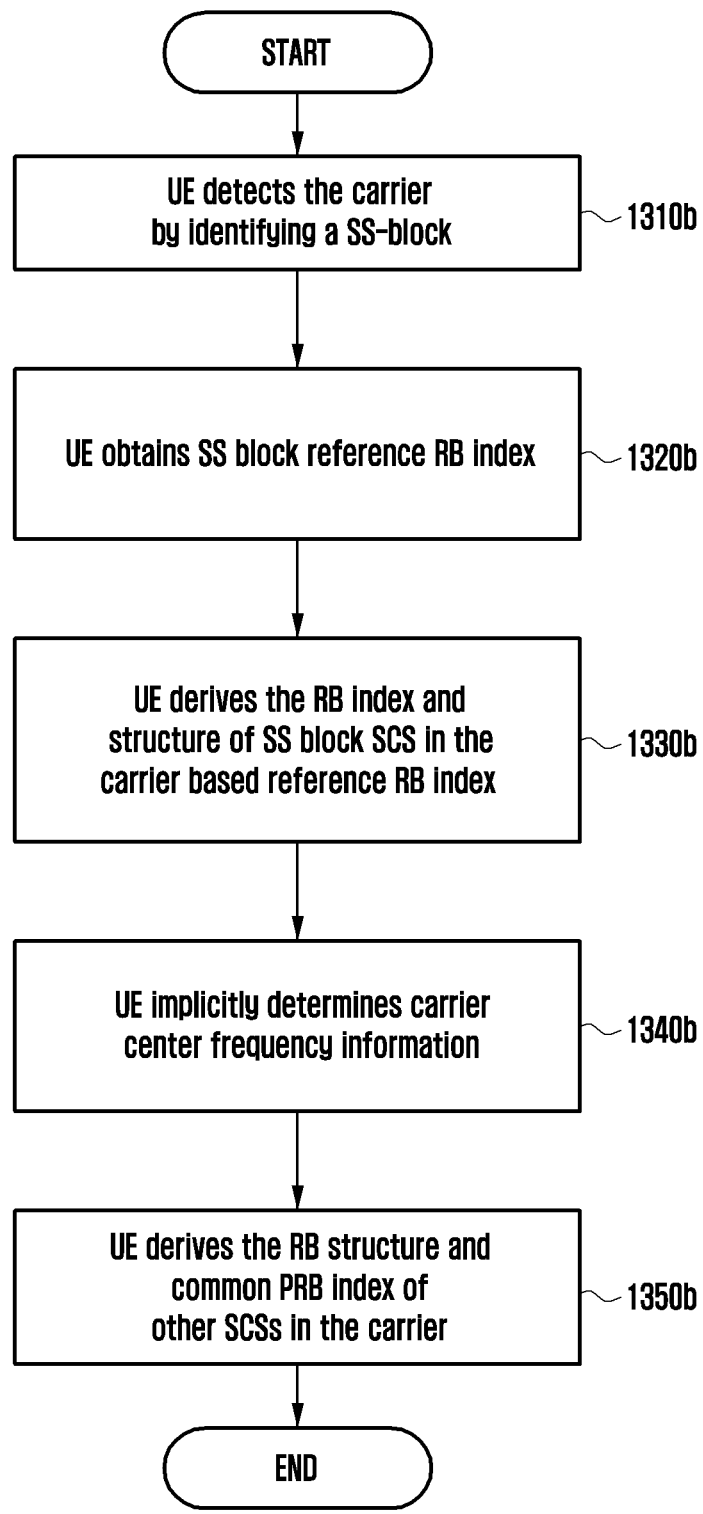

FIGS. 13a and 13b show UE procedures to obtain common PRB index according to embodiments of the disclosure.

Specifically, FIG. 13a shows a UE procedure in the case where the information of carrier center is available. Referring to FIG. 13a, the UE detects the carrier by identifying a SS-block at operation 1310a. The UE obtains information of carrier BW and/or carrier location at operation 1320a. If the information of carrier center is available, e.g., DL NARFCN and carrier BW is known, or for the UL carrier case, the UE can derive the RB structure, i.e., the frequency resource occupied by the carrier at operation 1330a, and hence derive the RB index for each possible SCS at operation 1340a, based on a RB indexing rule.

FIG. 13b shows a UE procedure in the case where the information of carrier center is not available. Referring to FIG. 13b, the UE detects the carrier by identifying a SS-block at operation 1310b. The UE obtains SS block reference RB index at operation 1320b. If the information of carrier center is not available, one specific RB index of the SS block can be indicated to enable UE obtain RB indexing in the whole carrier. For example, the specific RB can be the one closest to the center frequency of the SS block or the RB in one edge side of the SS block. The UE derives the RB index and structure of SS block SCS in the carrier based on reference RB index at operation 1330b. Based on the indicated specific RB index and derived RB structure in the carrier, the RB index of the SS block SCS in the whole carrier can be derived. After that, the UE implicitly determines carrier center frequency information at operation 1340b. The UE derives the RB structure and common PRB index of other SCSs in the carrier at operation 1350b. The RB index of other SCSs can be derived based on the carrier center.

Carrier Center Originated Indexing—Multiple Carriers

Figure 14:
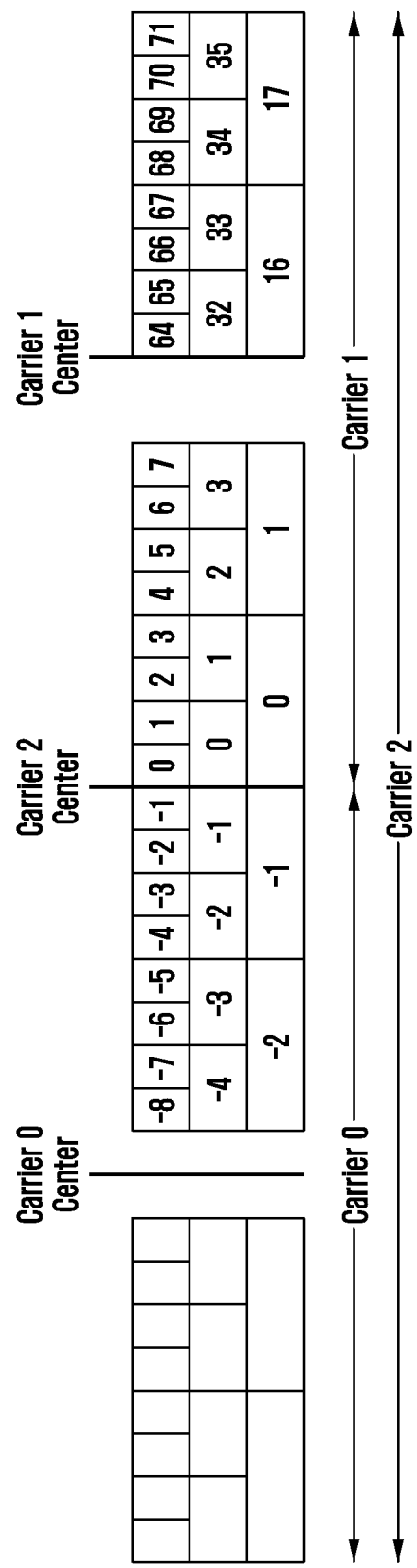
FIGS. 14 and 15 show examples of RB structure and indexing in multiple carriers case according to embodiments of the disclosure.
Figure 15:
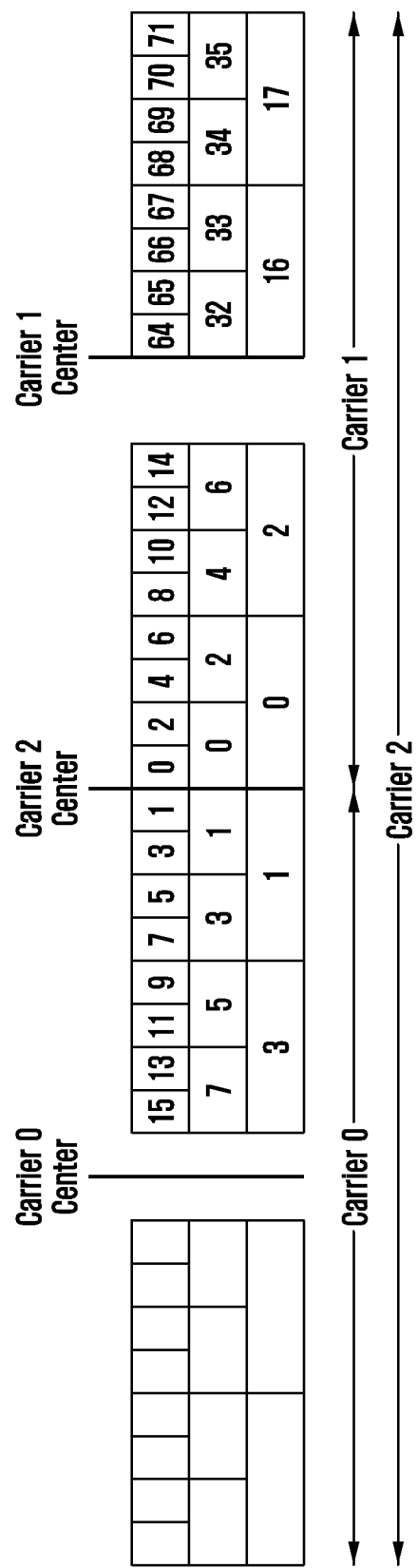

FIGS. 14 and 15 show examples of RB structure and indexing in multiple carriers case according to embodiments of the disclosure.

Referring to FIG. 14, the RBs are sequentially and/or cyclically indexed with scaled indexing method within multiple overlapping carriers. For example, the reference RB of a certain SCS can be the RB in the higher frequency side which aligns with the center frequency of the wideband carrier, e.g., carrier 2 in FIG. 14. The index of the reference RB is 0 and then the RBs are sequentially indexed to both frequency sides. If the information of a wideband carrier center frequency is available, the RB index can be derived implicitly. Or, if the information of a certain carrier center frequency is available, the index of one reference RB closest to the carrier center frequency with a certain SCS can be indicated. If the information of carrier center is not available, one specific RB index of the SS block can be indicated to enable UE obtain RB indexing in the whole carrier. Based on the indicated specific RB index and derived RB structure in the carrier, the RB index in the whole carriers can be derived.

Referring to FIG. 15, the RBs are sequentially and/or cyclically indexed with even numbers in the higher frequency side, and odd numbers in the lower frequency side.

SS-Block Center Originated Indexing—One Carrier

Figure 16:
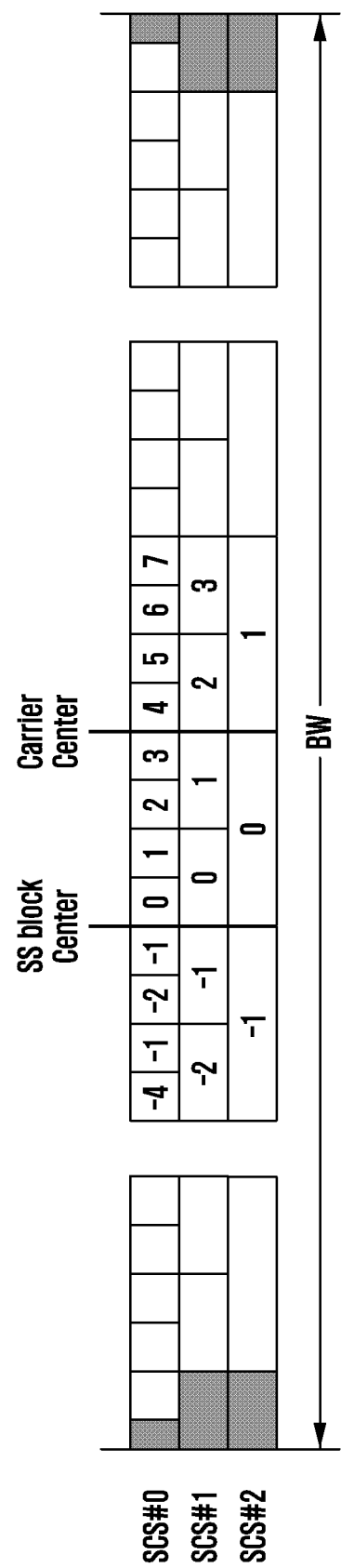
FIG. 16 shows another example of RB structure and indexing in a given carrier BW according to an embodiment of the disclosure.

FIG. 16 shows another example of RB structure and indexing in a given carrier BW according to an embodiment of the disclosure.

Referring to FIG. 16, the RBs are sequentially and/or cyclically indexed with scaled indexing method based on the SS block center frequency, e.g., denoted by SS-block center originated indexing. For example, the reference RB of a certain SCS can be the RB in the higher frequency side which aligns with the SS block. For example, the index of the reference RB is 0 and then the RBs are sequentially indexed to both frequency sides. This is applicable when the RB boundary with different SCS is aligned with the SS block center frequency. This is useful because the UE first identifies the RB structure of SS block in cell search. After detecting the SS-block, the UE can directly identify the RB structure of different SCS.

SS-Block Center Originated Indexing—Multiple Carriers

Figure 17:
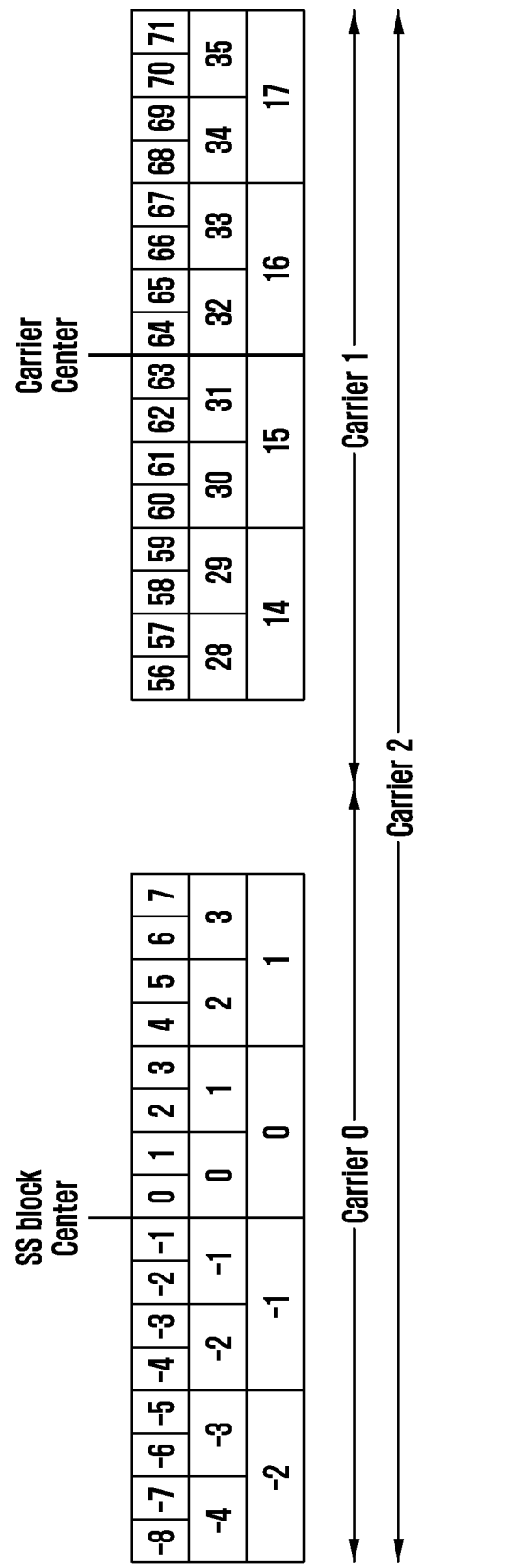
FIG. 17 shows another example of RB structure and indexing in multiple carriers case according to an embodiment of the disclosure.

FIG. 17 shows another example of RB structure and indexing in multiple carriers case according to an embodiment of the disclosure.

Referring to FIG. 17, the RBs are sequentially and/or cyclically indexed with scaled indexing method within multiple overlapping carriers. One specific RB index of a SS block in a certain carrier can be indicated to enable UE obtain RB indexing in the whole carriers. Based on the indicated specific RB index and derived RB structure in the carrier, the RB index in the whole carriers can be derived.

Figure 18:
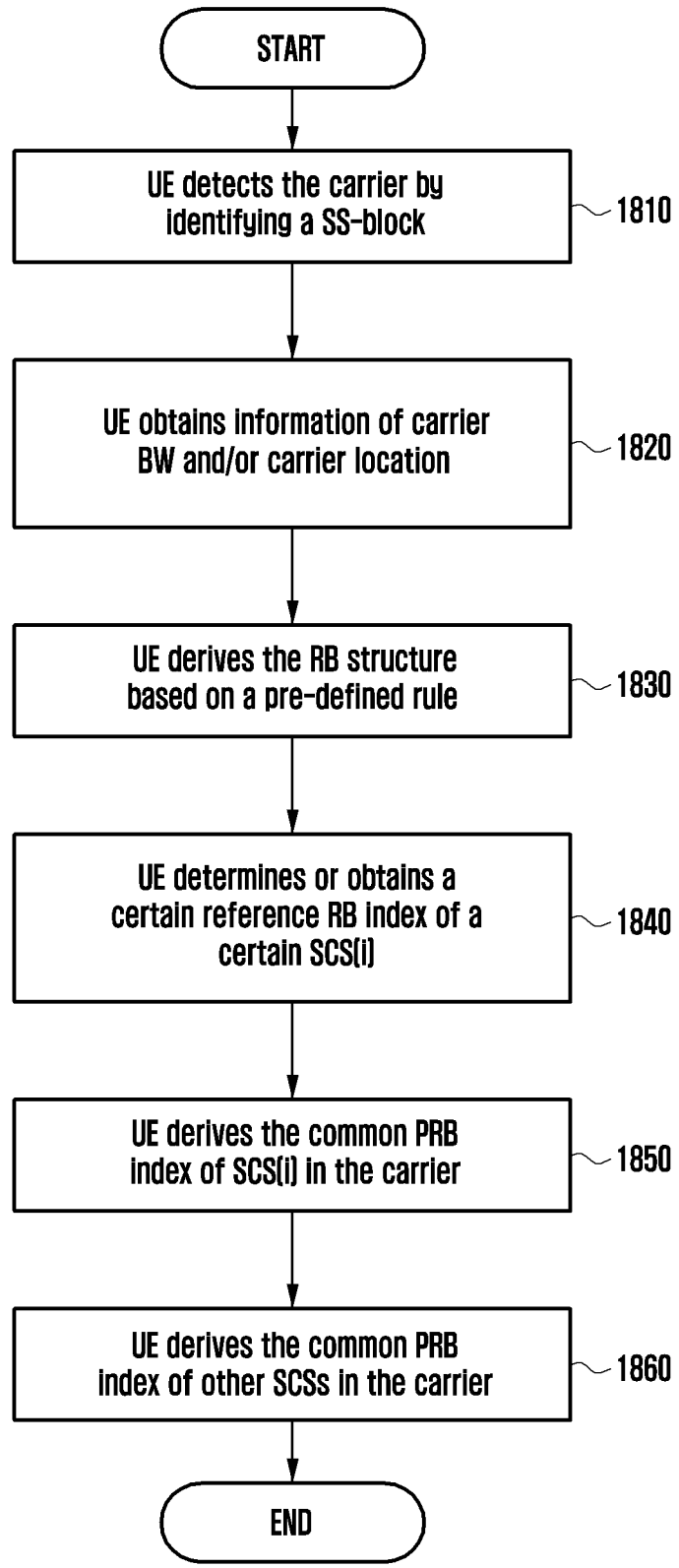
FIG. 18 shows the UE procedure to obtain the carrier information and common PRB index according to an embodiment of the disclosure.

FIG. 18 shows the UE procedure to obtain the carrier information and common PRB index according to an embodiment of the disclosure.

Referring to FIG. 18, the UE detects the carrier by identifying a SS-block at operation 1810. The UE obtains information of carrier BW and/or carrier location at operation 1820. The UE derives the RB structure based on a pre-defined rule at operation 1830. The UE determines or obtains a certain reference RB index of a certain SCS(i) at operation 1840. The UE derives the common PRB index of SCS(i) in the carrier at operation 1850. The UE derives the common PRB index of other SCSs in the carrier at operation 1860.

UL Carrier Case

For TDD operation, the common PRB index can be used for both DL and UL. In FDD UL case, a common PRB index can be used in the UL carrier, or shared by multiple UL carriers if overlapping. The common PRB indexing can be used for generation of RS sequences if shared by multiple carriers, or it can be used for UL BWP configuration.

The information of the UL carrier can be signaled in the system information, e.g., RMSI. Similarly, the maximum integer number of RBs in the given BW can be considered to support forward compatibility. The RB can be indexed from a certain reference point, e.g., the carrier edge (lower frequency side), or the carrier center.

Carrier Edge Originated Indexing

In the UL carrier, the RBs are sequentially indexed based on the lower frequency side, e.g., denoted by carrier edge originated RB indexing. For a certain SCS, the first RB index is 0 and then the RBs are sequentially indexed till to the higher frequency side. The scaled and/or cyclic indexing methods can be considered.

Figure 19A:
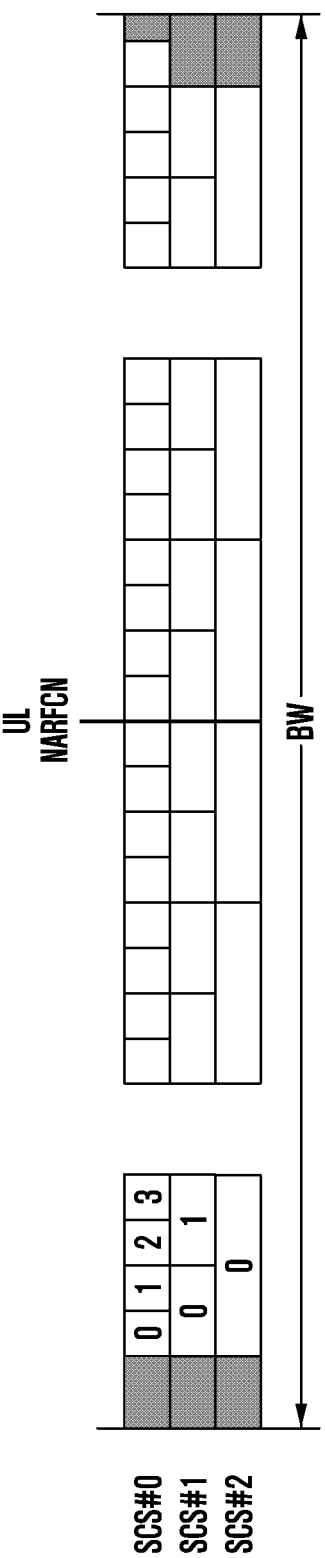
FIG. 19a shows an example of carrier edge originated RB indexing based on the scaled RB indexing according to an embodiment of the disclosure.

FIG. 19a shows an example of carrier edge originated RB indexing based on the scaled RB indexing according to an embodiment of the disclosure. This is applicable when the RB boundary with different SCS is aligned with the lowest frequency edge side in the carrier.

With the scaled RB indexing rule, if a certain RB index (e.g., n) with a given SCS $f$ is known, it can be determined that there can be one of the following two cases for the RB with larger SCS $2f$:

The RB $\lfloor n/2 \rfloor$ with larger SCS $2f$ is nested with RB n and RB n+1 with SCS $f$, if mod(n,2)=0.
The RB $\lfloor n/2$ with larger SCS $2f$ is nested with RB n−1 and RB n with SCS $f$, if mod(n,2)=1.

Similarly, if a certain RB index (e.g., n) with a given SCS $f$ is known, it can be determined that for the RB with smaller SCS $$\frac{f}{2}:$$

The RB n with SCS $f$ is nested with RB 2n and RB 2n+1 with SCS $$\frac{f}{2}.$$

In this way, the RB structure and RB index of all the SCSs can be derived based on one known RB index in a certain SCS.

To inform the common RB index to UEs, the RB index of a reference RB given a certain subcarrier spacing or reference location can be indicated, e.g., in RMSI or higher layer signaling. For example, the index of a UL NARFCN can be implicitly derived or explicitly indicated in RMSI, as a reference to derive the location of UL carrier. Given the reference UL NARFCN, the location may correspond to a subcarrier in a RB given certain subcarrier spacing. Or the location may correspond to a middle point between two adjacent subcarriers given certain subcarrier spacing The reference subcarrier spacing can be pre-defined, e.g., the one used by SS-block, or the one used by RMSI, or the one used by MSG3 transmission if it is configured. The subcarrier spacing of SS-Block and/or RMSI is the subcarrier spacing mainly used in DL carrier, and the subcarrier spacing of MSG3 is at least one of the subcarrier spacing used in the UL. Or, if the subcarrier spacing for MSG3 transmission is indicated, it can be the reference subcarrier spacing used for indication of the RB index information. Or, the reference subcarrier spacing can be defined per frequency range, e.g., sub-6 GHz, above-6 GHz, etc. Alternatively, it can be explicitly indicated about which subcarrier spacing is assumed for indicating the offset corresponding to the UL NARFCN, e.g., if expressed by number of RBs and/or subcarriers.

The location of UL NARFCN can be expressed by an offset from the lower frequency edge side in the UL carrier.

Figure 19B:
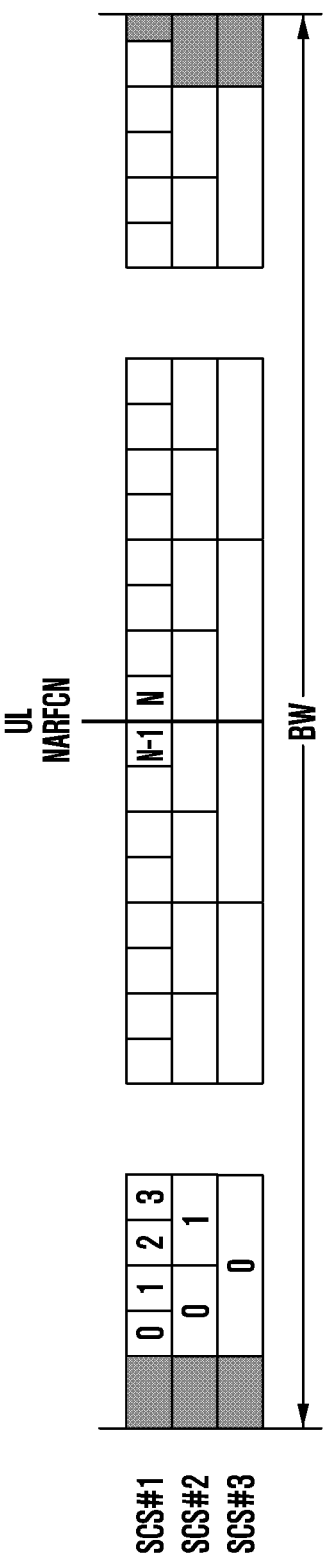
FIG. 19b shows an example of aligned RB grid between UL NARFCN and system RB grid according to an embodiment of the disclosure.

FIG. 19b shows an example of aligned RB grid between UL NARFCN and system RB grid according to an embodiment of the disclosure.

In one case, the UL NARFCN may correspond to a certain fixed subcarrier of in a RB, e.g., the subcarrier in the lower frequency side in a RB. Referring to the example in FIG. 19b, the UL NARFCN overlaps with the subcarrier in the lower frequency side within a RB with index N in the UL carrier. By indicating the RB index N associated with the UL NARFCN, the corresponding common RB index in the whole UL carrier can be derived. By applying the relationship of scaled RB index among different SCSs, the common RB index of other subcarrier spacing cases can be derived as well.

In another case, the UL NARFCN may correspond to a middle point of two adjacent RBs, e.g., between the subcarrier in the higher frequency side of RB N−1 and the subcarrier in the lower frequency side of RB N. If this is always the case, by indicating the RB index N associated with the UL NARFCN, the UE may assume an offset of N RBs from the PRB0, and adopt a half-subcarrier shift for the corresponding UL NARFCN. Then the RB grid and corresponding common RB index in the whole UL carrier can be derived. By applying the relationship of scaled RB index among different SCSs, the common RB index of other subcarrier spacing cases can be derived as well.

In another case, the UL NARFCN may not always align with a fixed subcarrier in a RB in the UL carrier. For example, the UL NARFCN may be aligned with any subcarrier in a RB.

Figure 19C:
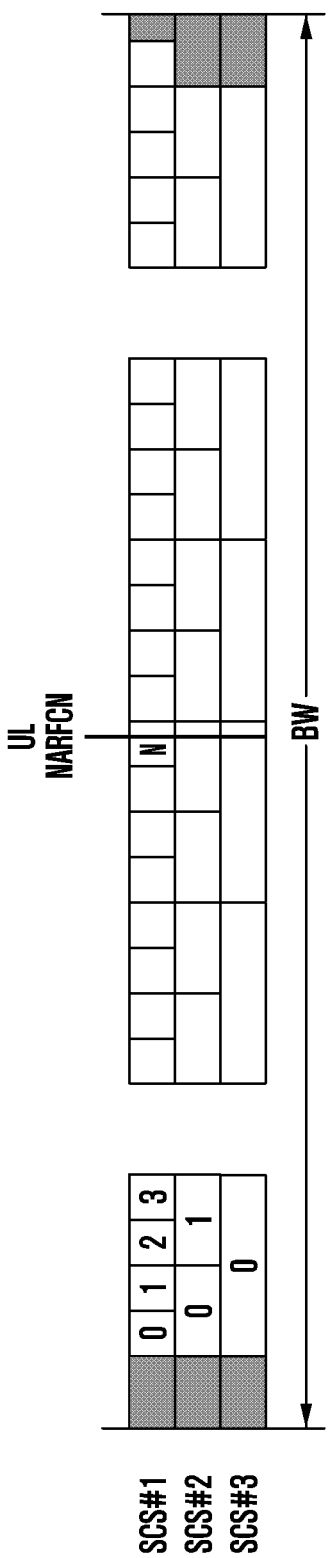
FIGS. 19c and 19d show an example of unaligned RB grid between UL NARFCN and system RB grid according to an embodiment of the disclosure.
Figure 19D:
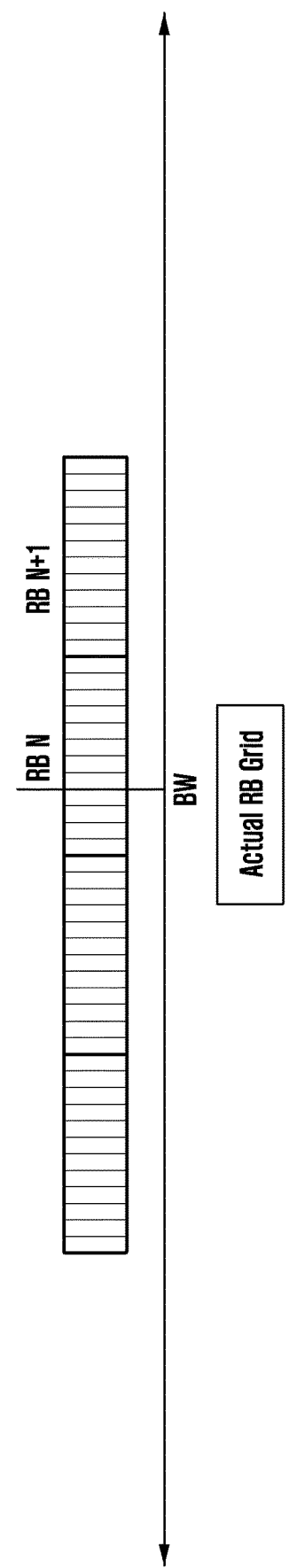

FIGS. 19c and 19d show an example of unaligned RB grid between UL NARFCN and system RB grid according to an embodiment of the disclosure.

Referring to the example in FIGS. 19c and 19d, the UL NARFCN is aligned with one subcarrier in the RB with index Nin the UL carrier. The offset between the lower frequency edge side (e.g., PRB 0) and the UL NARFCN can be indicated by a number of RBs and a number of subcarriers. By indicating the RB index N, the UE can assume that the UL NARFCN is located in the RB with index N. Given 12 subcarriers per RB, the exact subcarrier index can be further indicated by 4 bits. By combining both indications, the UE can derive the actual RB grid and the corresponding common RB index in the system carrier. If there is possibility that the UL NARFCN may be aligned with one subcarrier or located between two adjacent subcarriers, the further indication of half-subcarrier offset can be signaled, e.g., by 1 bit to indicate there is half-subcarrier offset or not. So, given the reference UL NARFCN index, and the corresponding location based on the offset indicated in terms of number of RBs, and/or number of subcarriers, and/or number half-subcarrier, the UE can derive the actual RB grid and the corresponding common RB index in the system carrier. By applying the relationship of scaled RB index among different SCSs, the common RB index of other subcarrier spacing cases can be derived as well.

So, in above approaches, the indication of UL NARFCN and offset in terms of number of RBs and/or subcarriers and/or half-subcarriers can be in RMSI and/or UE-specific RRC signaling. Based on the combined indications, the common RB index of all subcarrier spacing in the whole carrier can be derived.

If the RB grid relationship among different SCSs is not available, e.g., the UE may not know the relative positions of RB grid for different SCSs. The relationship of RB grid among different SCSs can be further indicated. For example, given a lowest subcarrier spacing SCS #0 in the frequency range and another higher subcarrier spacing SCS #1, the offset between PRB0 with subcarrier spacing SCS #0 and PRB0 with subcarrier spacing SCS #1 can be indicated, e.g., in terms of number of RBs with subcarrier spacing SCS #0. For all the supported subcarrier spacing in the frequency range, the offsets between PRB0 with subcarrier spacing SCS #0 and PRB0 with other SCSs can be indicated separately. Based on the offset information of the RB grid of different subcarrier spacing, the RB grid or the RB boundary alignment in the UL carrier can be derived.

In another embodiment, it is also possible to indicate the separation between a reference point in the DL carrier and a reference point in the UL carrier. For example, the separation between the PRB 0 in the DL carrier and the PRB 0 in the UL carrier can be indicated. Similarly, based on the offset indicated in terms of number of RBs, and/or number of subcarriers, and/or number of half-subcarrier, the UE can derive the actual RB grid and the corresponding common RB index in the system carrier. The numerology used for indication can be pre-defined, or explicitly indicated. By applying the relationship of scaled RB indexing among different SCSs, the common RB index of other subcarrier spacing cases can be derived as well.

Or, the separation between the DL NRAFCN and UL NRAFCN can be first indicated in terms of number of channel raster sizes. Then, the relative location of UL NRAFCN in the carrier can be further indicated, e.g., indicated by the offset from the PRB0, in terms of number of RBs, and/or number of subcarriers, and/or number of half-subcarrier. So the UE can derive the actual RB grid and the corresponding common RB index in the system carrier.

The above indication methods for carrier information can be used for both primary cell/carrier and secondary cell/carrier cases. In addition, for the secondary cell/carrier configuration, the following indication methods can be considered.

In DL Scell/Scarrier case, one reference NARFCN in the carrier can be indicated to the UE via RRC signaling. The frequency band information can be indicated together if the NARFCN is not unique in the whole frequency range. The reference NARFCN can be the NARFCN in the carrier center or close to the carrier center, or a certain NARFCN within the carrier, e.g., the one close to the lowest frequency side of the carrier, PRB0. The index of NARFCN can be explicitly indicated. If the NARFCN corresponds to the carrier center, the BW can be indicated together to obtain carrier information. Or, the relative location information of the NARFCN in the carrier can be indicated. Assume that RBs can be indexed from a certain reference point based on a pre-defined rule, e.g., the carrier edge (lower frequency side). Given the reference NARFCN, the location may correspond to a subcarrier in a RB given certain subcarrier spacing. Or the location may correspond to a middle point between two adjacent subcarriers given certain subcarrier spacing.

The reference subcarrier spacing can be pre-defined, e.g., the one used by SS-block in the primary cell/carrier, or the one used by RMSI in the primary cell/carrier, since the subcarrier spacing of SS-Block and/or RMSI is the subcarrier spacing mainly used in DL carrier. Or, the reference subcarrier spacing can be defined per frequency range, e.g., sub-6 GHz, above-6 GHz, etc. Alternatively, it can be explicitly indicated about which subcarrier spacing is assumed for indicating the offset corresponding to the DL NARFCN, e.g., if expressed by number of RBs and/or subcarriers.

The location of the reference NARFCN can be expressed by an offset from the lower frequency edge side in the secondary cell/carrier.

In one case, the reference NARFCN may correspond to a certain fixed subcarrier of in a RB, e.g., the subcarrier in the lower frequency side in a RB. For example, the reference NARFCN overlaps with the subcarrier in the lower frequency side within a RB with index N in the carrier. By indicating the RB index N associated with the NARFCN, the corresponding common RB index in the secondary cell/carrier can be derived. By applying the relationship of scaled RB index among different SCSs, the common RB index of other subcarrier spacing cases can be derived as well.

In another case, the reference NARFCN may correspond to a middle point of two adjacent RBs, e.g., between the subcarrier in the higher frequency side of RB N−1 and the subcarrier in the lower frequency side of RB N. If this is always the case, by indicating the RB index N associated with the NARFCN, the UE may assume an offset of N RBs from the PRB0, and adopt a half-subcarrier shift for the corresponding NARFCN. Then the RB grid and corresponding common RB index in the whole carrier can be derived. By applying the relationship of scaled RB index among different subcarrier SCSs, the common RB index of other subcarrier spacing cases can be derived as well.

In another case, the reference NARFCN may not always align with a fixed subcarrier in a RB in the UL carrier. For example, the reference NARFCN may be aligned with any subcarrier in a RB. For example, the reference NARFCN is aligned with one subcarrier k in the RB with index N in the UL carrier. The offset between the lower frequency edge side (e.g., PRB 0) and the reference NARFCN can be indicated by a number of RBs and a number of subcarriers. By indicating the RB index N, the UE can assume that the reference NARFCN is located in the RB with index N. Given 12 subcarriers per RB, the exact subcarrier index can be further indicated by 4 bits. By combining both indications, the UE can derive the actual RB grid and the corresponding common RB index in the carrier. If there is possibility that the reference NARFCN may be aligned with one subcarrier or located between two adjacent subcarriers, the further indication of half-subcarrier offset can be signaled, e.g., by 1 bit to indicate there is half-subcarrier offset or not. So, given the reference NARFCN index, and the corresponding location based on the offset indicated in terms of number of RBs, and/or number of subcarriers, and/or number half-subcarrier, the UE can derive the secondary carrier location information and actual RB grid and the corresponding common RB index in the carrier. By applying the relationship of scaled RB index among different SCSs, the common RB index of other subcarrier spacing cases can be derived as well.

So, in above approaches, the indication of reference NARFCN and offset in terms of number of RBs and/or subcarriers and/or half-subcarriers can be in RMSI and/or UE-specific RRC signaling. Based on the combined indications, the location of the secondary carrier and common RB index of all subcarrier spacing in the whole carrier can be derived.

In another embodiment, it is also possible to indicate the separation between a reference point in the primary DL carrier and a reference point in the secondary DL carrier. For example, the separation between the PRB 0 in the primary DL carrier and the PRB 0 in the secondary carrier can be indicated. Similarly, based on the offset indicated in terms of number of channel raster size, and/or number of RBs, and/or number of subcarriers, and/or number half-subcarrier, the UE can derive the location of PRB0 in the secondary carrier, and the actual RB grid and the corresponding common RB index in the secondary carrier. By applying the relationship of scaled RB indexing among different SCSs, the common RB index of other subcarrier spacing cases can be derived as well.

The gNB can inform UEs about the presence of SS-block in the Scell/Scarrier. If present, the SS block location information can be indicated to enable UE search SS-block quickly. For example, the corresponding SS block numerology/subcarrier spacing and reference location of SS-block can be indicated. The reference location can be the offset from PRB0 to the lowest RB of the SS block in the secondary carrier. The offset may be expressed by the number of RBs with the corresponding SS-block subcarrier spacing in the Scell, and the number of subcarriers since the SS-block may not always aligned with actual RB boundary or RB grid. Based on the offset information of SS-block in the secondary carrier, the UE can easily locate the SS-block for access and measurements in the secondary cell/carrier. This information related to SS-block can be configured together with secondary cell configuration. If not configured, the UE may need to blind search the SS-block based on the indicated carrier location information, e.g., search from lowest frequency side PRB0 with a step of a pre-defined synchronization raster in the frequency band.

In another embodiment, the gNB can inform UEs about the separation between the SS-block in the primary carrier and the SS-block in the secondary carrier. The separation can be indicated by the number of synchronization raster sizes. Even though there is no SS-block in the secondary carrier, a virtual separation value can be indicated, which enable UE to know the location of secondary carrier.

D. Initial BWP Information

[DL BWP Case]

In the RMSI, a bandwidth part (BWP) can be configured to enable UE to perform random access procedure and to complete RRC connection with gNB. A DL BWP can be used to receive other system information (OSI), or the RAR. In the DL BWP configuration, at least the numerology and the frequency resources can be configured.

Figure 20:
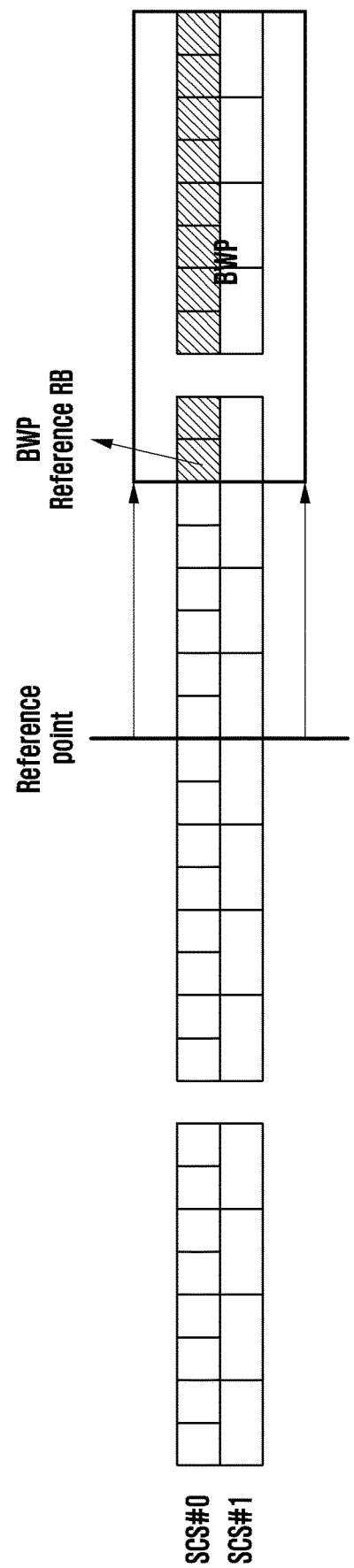
FIG. 20 shows an example of BWP frequency resource configuration according to an embodiment of the disclosure.

FIG. 20 shows an example of BWP frequency resource configuration according to an embodiment of the disclosure.

The frequency resource may include a BWP frequency position of the BWP and the BW in terms of number of RBs. For example, the BWP frequency location can be a certain pre-defined PRB in the BWP, e.g., denoted as a BWP reference PRB, which can be the lowest PRB in the BWP.

If the common PRB index is known from system information, the common PRB index of the corresponding BWP reference PRB can be explicitly indicated as a BWP frequency location.

Alternatively, the BWP frequency position can be obtained by indicate an offset relative to a certain reference point in the carrier. Since the BWP has a specific SCS, the reference point can be a frequency location that the RB boundary of all SCSs is aligned with it. For the DL BWP case, the reference point can be the RB in the lower frequency side in the carrier, or the carrier center, or the SS block center. For the UL BWP case, the reference point can be the RB in the lower frequency side in the carrier, or the carrier center.

The offset of the BWP reference PRB can be expressed by the number of RBs with the configured BWP SCS Similarly, the BW of the BWP can be indicated in terms of the PRBs with the configured BWP SCS. If there are NPRBs in the configured BWP, the BWP-specific local PRB index can be defined, i.e., $\{0, 1, \ldots, N-1\}$ from the lower frequency side to the higher frequency side in the BWP.

The BW can be by default the minimum UE BW supported in the frequency range. Or, it can be explicitly indicated in terms of number of RBs with the configured subcarrier spacing.

[UL BWP Case]

The carrier information for UL operation before RRC connection can be configured, and it is assumed that the carrier information such as UL NARFCN and/or carrier BW is known. Similarly, an UL BWP can be configured in RMSI, e.g., including the corresponding numerology and the frequency resources. For example, there can be an initial UL BWP used for initial access procedure, e.g., MSG3 transmission.

If the UL common PRB index is known from system information, the common PRB index of the corresponding BWP reference PRB can be explicitly indicated as a BWP frequency location. For the RACH frequency resource configuration, e.g., initial UL BWP configuration, the frequency locations can be configured based on the common UL PRB index.

Alternatively, the BWP frequency position can be obtained by indicating an offset relative to a pre-defined reference point.

The reference point can be the RB in the lower frequency side in the carrier, or the carrier center. The offset of the UL BWP reference PRB can be expressed by the number of RBs with the configured BWP SCS. Similarly, the BW of the BWP can be indicated in terms of the PRBs with the configured BWP SCS. If there are N PRBs in the configured BWP, the BWP-specific local PRB index can be defined, i.e., $\{0, 1, \ldots, N-1\}$ from the lower frequency side to the higher frequency side in the BWP.

To allow flexibility of UL MSG3 transmission, multiple UL BWPs can be configured in RMSI. The exact UL BWP to be used for MSG3 transmission information can be indicated the RAR.

The BW of the BWP can be by default the minimum UE BW supported in the frequency range. Or, it can be explicitly indicated in terms of number of RBs with the configured subcarrier spacing.

E. UE-Specific BWP Information

After the UE is connected to the system, the UE can obtain the system information and RRC configurations. In the system information or UE-specific RRC signaling, the carrier information can be configured. For a UE, one or multiple carriers can be configured. For each carrier, the related parameters described above are all configured if not available in the system information, e.g., the carrier center information such as NARFCN, frequency band information, carrier BW.

In each carrier, one or multiple BWPs can be configured. The BWPs for a DL carrier and BWPs for a UL carrier can be configured separately.

The BWP can be defined by the following parameters. The BWP parameters can be configured explicitly or implicitly to UE via dedicated RRC signaling.

Carrier Index
BWP Index
The BWP index can be specific to the UE. It can be used as the reference for BWP activation/deactivation. In addition, each BWP may have a carrier specific index which is common in the carrier, e.g., if used for some BWP-specific parameters.
DL BWP or UL BWP
Numerology
e.g., subcarrier spacing (SCS) and CP type used in the BWP.
Frequency resources
The frequency resource occupied by the BWP, which can be determined by a certain reference frequency location and BW in terms of RBs
A common RB index if not available in common RRC signaling
[BWP Location/Size]
The frequency resource of a BWP may include a BWP frequency position of the BWP and the BW in terms of number of RBs. For example, the BWP frequency location can be a certain pre-defined PRB in the BWP, e.g., denoted as a BWP reference PRB, which can be the lowest PRB in the BWP.

If the common PRB index is known from system information, the common PRB index of the corresponding BWP reference PRB can be explicitly indicated as a BWP frequency location.

Alternatively, the BWP frequency position can be obtained by indicating an offset relative to a certain reference point in the carrier. Since the BWP has a specific SCS, the reference point can be a frequency location that the RB boundary of all SCSs is aligned with. For the DL BWP case, the reference point can be the RB in the lower frequency side in the carrier, or the carrier center, or the SS block center. For the UL BWP case, the reference point can be the RB in the lower frequency side in the carrier, or the carrier center.

The offset of the BWP reference PRB can be expressed by the number of RBs with the configured BWP SCS Similarly, the BW of the BWP can be indicated in terms of the PRBs with the configured BWP SCS. If there are NPRBs in the configured BWP, the BWP-specific local PRB index can be defined, i.e., $\{0, 1, \ldots, N-1\}$ from the lower frequency side to the higher frequency side in the BWP.

[Reserved PRB Sets]

In addition, some RBs in the BWP can be reserved and not used by the BWP, e.g., it can be used for other BWPs.

Figure 21:
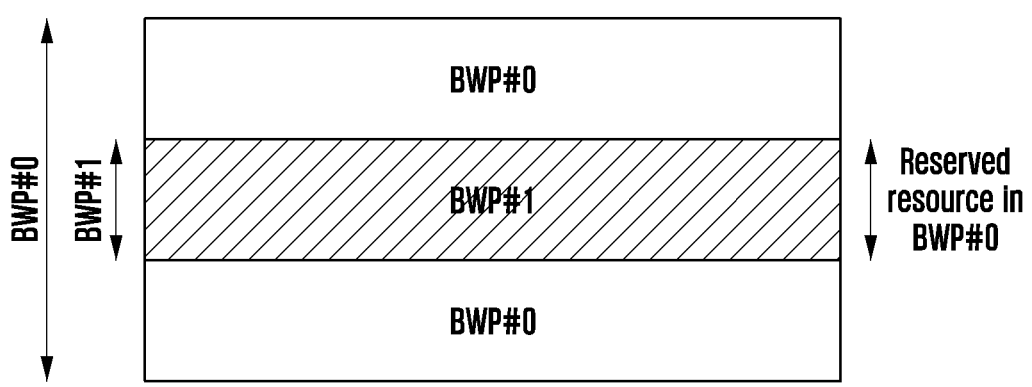
FIG. 21 shows an example of BWP frequency resource configuration where some RBs in the BWP is reserved and not used by the BWP and used for other BWPs.

FIG. 21 shows an example of BWP frequency resource configuration where some RBs in the BWP is reserved and not used by the BWP and used for other BWPs.

Referring to FIG. 21, BWP #0 is a wide BWP, e.g., span the whole carrier, and BWP #1 is a small BWP which can be used for some UEs to save power consumption. There can be one or more PRB sets reserved in a certain BWP, and each PRB set may include one or multiple contiguous PRBs. The PRB is defined as the one with the BWP specific SCS. So the number of reserved PRB set can be configured in the BWP configuration. For each reserved PRB set, the start PRB index and number of PRBs (or the end PRB index) can be indicated. The start PRB index can be defined by the local index within the configured BWP, i.e., from 0 to N−1.

For frequency domain resource allocation within a BWP, some parameters may depend on the BW of the BWP, or number of RBs in the BWP, e.g., the resource block group (RBG) size for a RBG based resource allocation. When determining the resource allocation parameters for the BWP, e.g., RBG size, the number of RBs in the reserved PRB set can be excluded when counting the number of RBs for the BWP. If there are total N RBs in the BWP, and M RBs are reserved, the UE assume that the number of RBs is N−M for frequency domain resource allocation, and the related resource allocation parameters are determined based on N−M. For example, if a RBG size of P is determined or configured, the required RBG bitmap length is $$\left\lceil \frac{N-M}{P} \right\rceil.$$

[Common RB Index]

In the BWP configuration, the common RB index of the BWP reference RB can be indicated but can be optional. If the common RB index is not indicated, the UE can assume that the RB index obtained in the system information and/or carrier configuration via higher layer signaling is the common RB index. If the common RB index is indicated, the UE assumes that the indicated common RB index overwrites the one obtained in the system information and/or carrier configuration. The indicated common RB index in the BWP configuration will be used in the cases where common RB index is needed, e.g., in RS signal generation based on pre-defined rule or configuration. After the UE knows the common PRB index of the corresponding BWP reference PRB, the UE can derive the common RB index of all RBs in the configured BWP.

Or, an offset can be indicated of the common RB index for the BWP reference RB can be indicated but can be optional. If not indicated, the UE can assume that the RB index obtained in the system information and/or carrier configuration via higher layer signaling is the common RB index. If indicated, the UE assumes that the common RB index equals to sum of the one obtained in the system information and/or carrier configuration and the indicated offset. The derived common RB index in the BWP configuration will be used in the cases where common RB index is needed, e.g., in RS signal generation based on pre-defined rule or configuration. After the UE knows the common PRB index of the corresponding BWP reference PRB, the UE can derive the common RB index of all RBs in the configured BWP.

Figure 22:
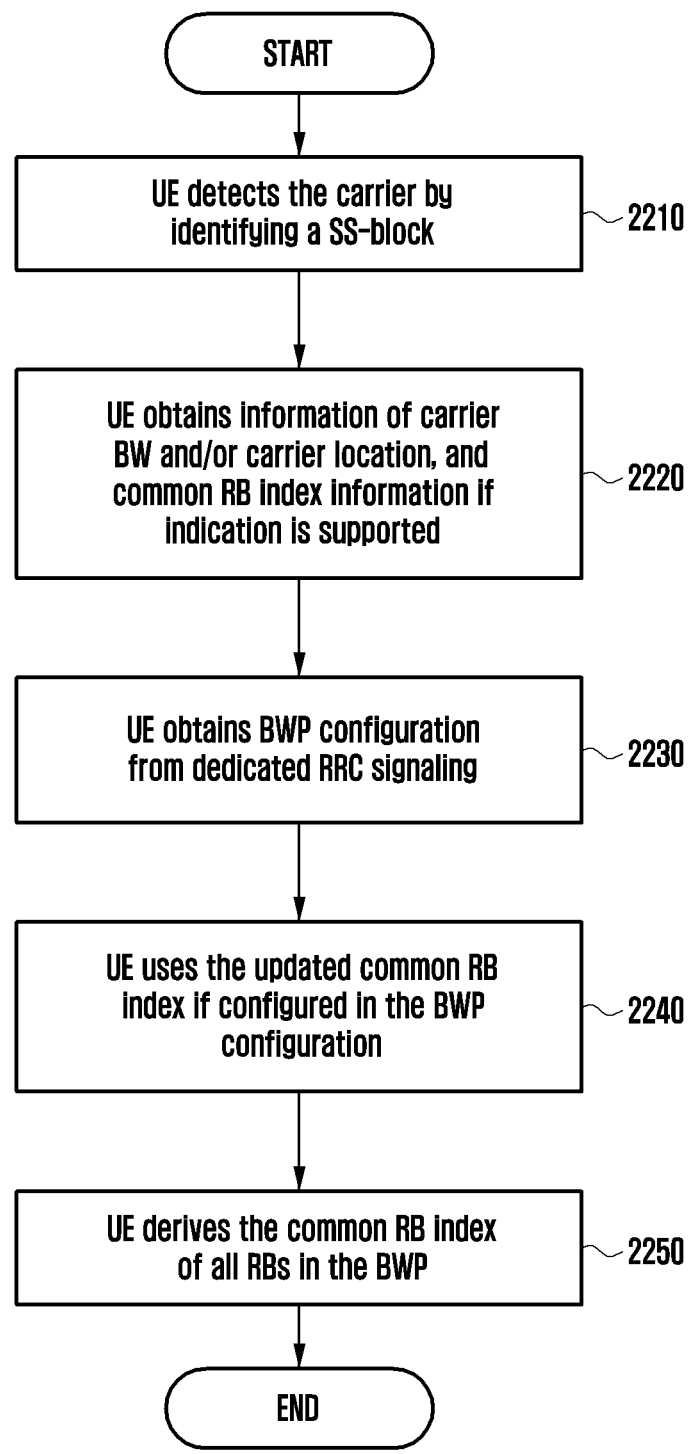
FIG. 22 shows the UE procedure to obtain common RB index in BWP configuration according to an embodiment of the disclosure.

FIG. 22 shows the UE procedure to obtain common RB index in BWP configuration according to an embodiment of the disclosure.

Referring to FIG. 22, the UE detects the carrier by identifying a SS-block at operation 2210. The UE obtains information of carrier BW and/or carrier location, and common RB index information if indication is supported at operation 2220. The UE obtains BWP configuration from dedicated RRC signaling at operation 2230. The UE uses the updated common RB index if configured in the BWP configuration at operation 2240. The UE derives the common RB index of all RBs in the BWP at operation 2250.

Figure 23:
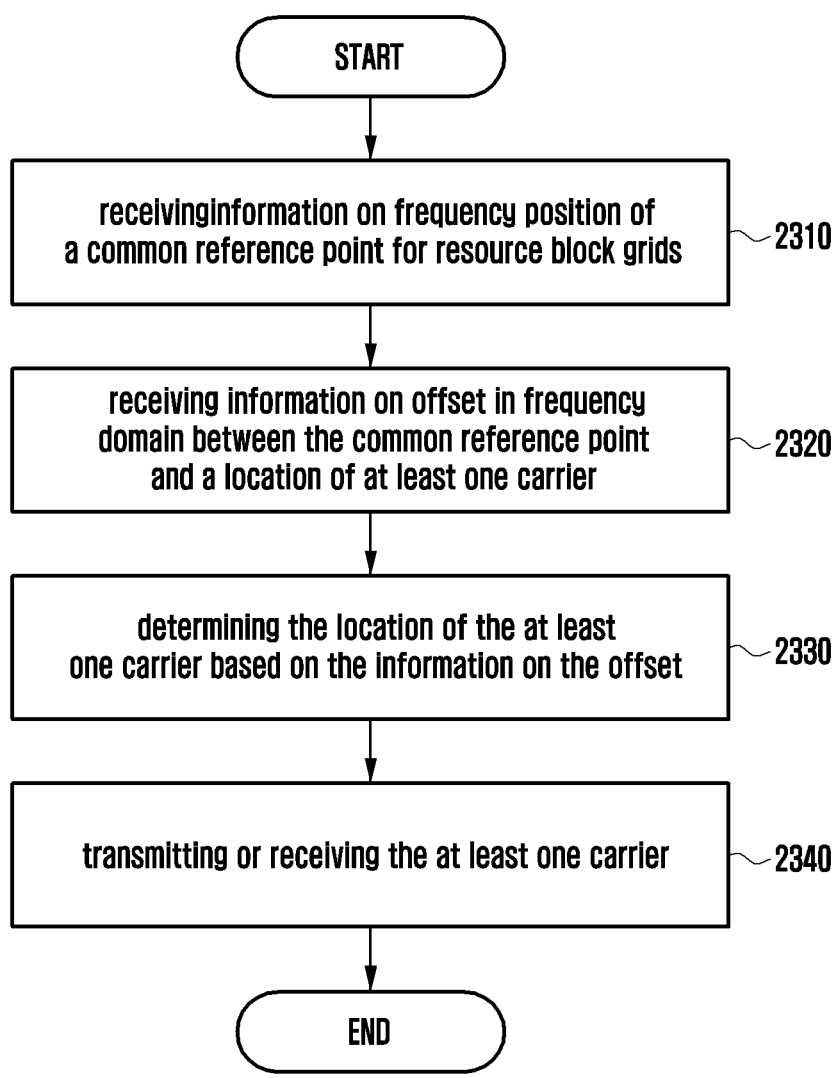
FIG. 23 is a flowchart of a method by a terminal for transmitting or receiving at least one carrier in a cellular network according to an embodiment of the disclosure.

FIG. 23 is a flowchart of a method by a terminal for transmitting or receiving at least one carrier in a cellular network according to an embodiment of the disclosure.

Referring to FIG. 23, the terminal receives information on frequency position of a common reference point for resource block grids from a base station at operation 2310, and receives information on offset in frequency domain between the common reference point and a location of at least one carrier from the base station at operation 2320. As described above, the information on the frequency position and the information on the offset are received in the system information or RRC signaling, simultaneously or separately. The information on the frequency position may represent the frequency offset in PRB between the common reference point and a lowest subcarrier of a lowest PRB of the SS block. The information on the frequency position may be defined in terms of resource blocks per frequency range based on whether the at least one carrier corresponds to a first frequency range or a second frequency range (e.g., sub-6 GHz, above-6 GHz, etc.) The information on the frequency position may represent the frequency location of the common reference point, which is expressed as in NARFCN. The terminal determines the location of the at least one carrier based on the information on the offset at operation 2330. The terminal transmits the at least one carrier to the base station for uplink transmission, or receives the at least one carrier from the base station for downlink reception at operation 2340.

Figure 24:
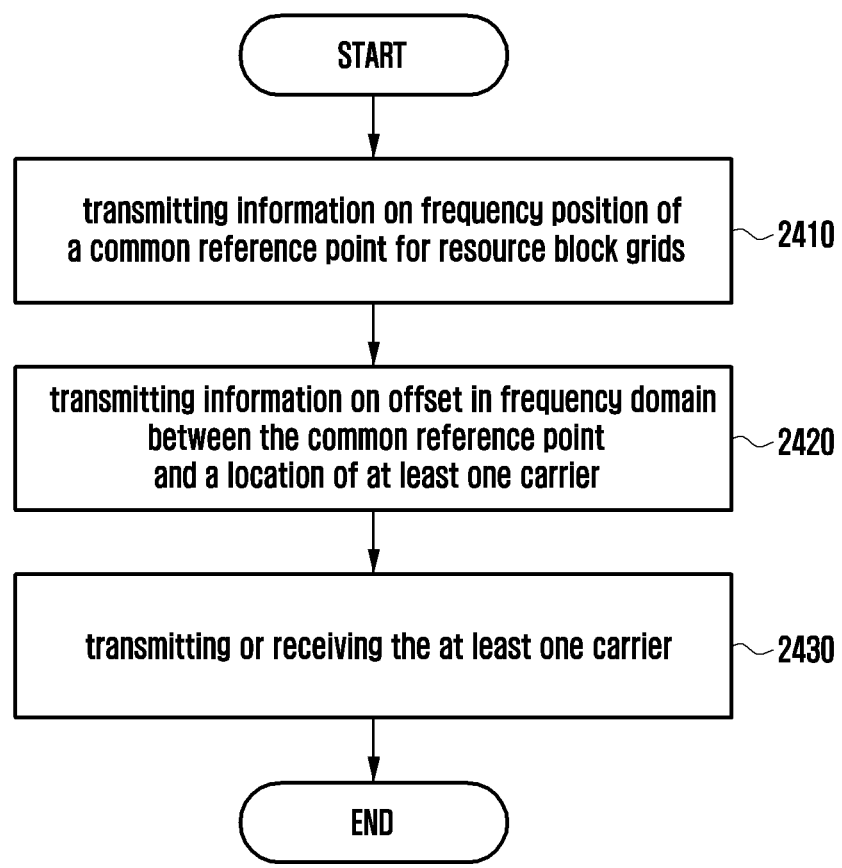
FIG. 24 is a flowchart of a method by a base station for transmitting or receiving at least one carrier in a cellular network according to an embodiment of the disclosure.

FIG. 24 is a flowchart of a method by a base station for transmitting or receiving at least one carrier in a cellular network according to an embodiment of the disclosure.

Referring to FIG. 24, the base station transmits information on frequency position of a common reference point for resource block grids to a terminal at operation 2410, and transmits information on offset in frequency domain between the common reference point and a location of at least one carrier to the terminal at operation 2430, in the system information or RRC signaling. The base station transmits the at least one carrier to the terminal for downlink transmission, or receives the at least one carrier from the terminal for uplink reception by identifying the location of the at least one carrier based on the information on the offset at operation 2430.

Figure 25:
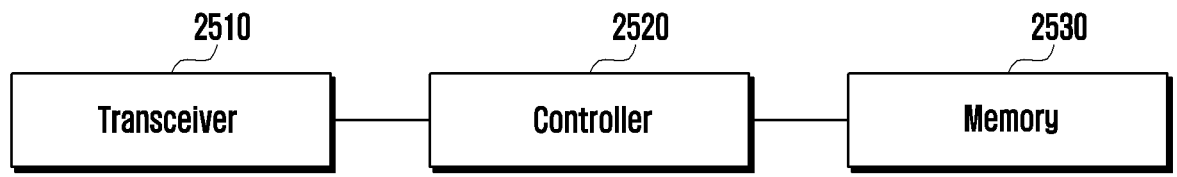
FIG. 25 is a block diagram of a terminal according to an embodiment of the disclosure.

FIG. 25 is a block diagram of a terminal according to an embodiment of the disclosure.

Referring to FIG. 25, a terminal includes a transceiver 2510, a controller 2520 and a memory 2530. The transceiver 2510, the controller 2520 and the memory 2530 are configured to perform UE procedures of FIGS. 2, 6a, 6b, 6f, 10, 13a, 13b, 18, 22 and 23, or described above. Although the transceiver 2510, the controller 2520 and the memory 2530 are shown as separate entities, they may be realized as a single entity like a single chip. The transceiver 2510, the controller 2520 and the memory 2530 may be electrically connected to or coupled with each other.

The transceiver 2510 may transmit and receive signals to and from the other network entities, e.g. a base station.

The controller 2520 may control the terminal to perform a function according to one of the embodiments described above. For example, the controller 2520 may be configured to control the transceiver to receive information on frequency position of a common reference point for resource block grids from the base station, control the transceiver to receive information on offset in frequency domain between the common reference point and a location of at least one carrier from the base station, determine the location of the at least one carrier based on the information on the offset, and control the transceiver to transmit or receive the at least one carrier. In addition, the controller 2520 may be further configured to control the transceiver to receive a SS block from the base station. The controller 2520 may refer to a circuitry, an ASIC, or at least one processor.

In an embodiment, the operations of the terminal may be implemented using the memory 2530 storing corresponding program codes. Specifically, the terminal may be equipped with the memory 2530 to store program codes implementing desired operations. To perform the desired operation, the controller 2520 may read and execute the program codes stored in the memory 2530 by using a processor or a central processing unit (CPU).

Figure 26:
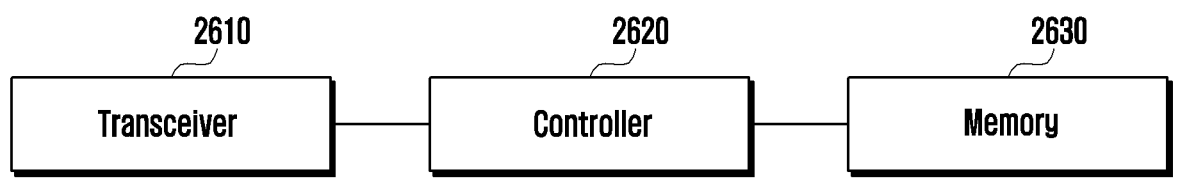
FIG. 26 is a block diagram of a base station according to an embodiment of the disclosure.

FIG. 26 is a block diagram of a base station according to an embodiment of the disclosure.

Referring to FIG. 26, a base station includes a transceiver 2610, a controller 2620 and a memory 2630. The transceiver 2610, the controller 2620 and the memory 2630 are configured to perform the operations described above. Although the transceiver 2610, the controller 2620 and the memory 2630 are shown as separate entities, they may be realized as a single entity like a single chip. The transceiver 2610, the controller 2620 and the memory 2630 may be electrically connected to or coupled with each other.

The transceiver 2610 may transmit and receive signals to and from the other network entities, e.g. a terminal.

The controller 2620 may control the base station to perform a function according to one of the embodiments described above. For example, the controller 2620 may be configured to control the transceiver to transmit information on frequency position of a common reference point for resource block grids to the terminal, control the transceiver to transmit information on offset in frequency domain between the common reference point and a location of the at least one carrier to the terminal, determine the location of the at least one carrier based on the information on the offset, and control the transceiver to transmit or receive the at least one carrier. In addition, the controller 2620 is further configured to control the transceiver to transmit a SS block to the terminal. The controller 2620 may refer to a circuitry, an ASIC, or at least one processor.

In an embodiment, the operations of the base station may be implemented using the memory 2630 storing corresponding program codes. Specifically, the base station may be equipped with the memory 2630 to store program codes implementing desired operations. To perform the desired operation, the controller 2620 may read and execute the program codes stored in the memory 2630 by using a processor or a CPU.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of indicates a disjunctive list such that, for example, a list of "at least one of A, B, or C" means A or B or C or AB or AC or BC or ABC (i.e., A and B and C).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, a synchronization signal (SS) block;
    receiving, from the base station, first information on a reference point associated with common resource blocks;
    receiving, from the base station, second information associated with a frequency domain location of a bandwidth part (BWP);
    identifying third information on a subcarrier offset between a lowest subcarrier of the SS block and a lowest subcarrier of at least one of resource blocks which overlaps with the SS block; and
    identifying the frequency domain location of the BWP based on the second information,
    wherein an offset between a reference point in a carrier associated with the BWP and a starting resource block of the BWP is identified based on the second information, and
    wherein the common resource blocks are indexed from 0 and upwards in a frequency domain for a subcarrier spacing configuration based on the reference point.

2. The method of claim 1, further comprising:
    receiving, from the base station, information on a frequency location of a reference point for uplink as an absolute radio frequency channel number (ARFCN).

3. The method of claim 1, further comprising:
    receiving, from the base station, information indicating an absolute radio frequency channel number (ARFCN) for a carrier associated with a secondary cell.

4. The method of claim 1, further comprising:
    identifying a reference subcarrier spacing defined per each of a first frequency range and a second frequency range,
    wherein the reference subcarrier spacing is associated with the SS block, and
    wherein the reference subcarrier spacing is assumed for indicating an offset from a lower frequency edge in a carrier.

5. A terminal in a wireless communication system, the terminal comprising:
    a transceiver configured to receive and transmit signals; and
    a controller coupled with the transceiver and configured to:
        control the transceiver to receive, from a base station, a synchronization signal (SS) block,
        control the transceiver to receive, from the base station, first information on a reference point associated with common resource blocks,
        control the transceiver to receive, from the base station, second information associated with a frequency domain location of a bandwidth part (BWP),
        identify third information on a subcarrier offset between a lowest subcarrier of the SS block and a lowest subcarrier of at least one of resource blocks which overlaps with the SS block, and
        identify the frequency domain location of the BWP based on the second information,
    wherein an offset between a reference point in a carrier associated with the BWP and a starting resource block of the BWP is identified based on the second information, and
    wherein the common resource blocks are indexed from 0 and upwards in a frequency domain for a subcarrier spacing configuration based on the reference point.

6. The terminal of claim 5, wherein the controller is further configured to:
    control the transceiver to receive, from the base station, information on a frequency location of a reference point for uplink as an absolute radio frequency channel number (ARFCN).

7. The terminal of claim 5, wherein the controller is further configured to:
    control the transceiver to receive, from the base station, information indicating an absolute radio frequency channel number (ARFCN) for a carrier associated with a secondary cell.

8. The terminal of claim 5, wherein the controller is further configured to:
    identify a reference subcarrier spacing defined per each of a first frequency range and a second frequency range,
    wherein the reference subcarrier spacing is associated with the SS block, and wherein the reference subcarrier spacing is assumed for indicating an offset from a lower frequency edge in a carrier.

9. A method performed by a base station in a wireless communication system, the method comprising:
   transmitting, to a terminal, a synchronization signal (SS) block;
   transmitting, to the terminal, first information on a reference point associated with common resource blocks;
   transmitting, to the terminal, second information associated with a frequency domain location of a bandwidth part (BWP); and
   transmitting, to the terminal, third information on a subcarrier offset between a lowest subcarrier of the SS block and a lowest subcarrier of at least one of resource blocks which overlaps with the SS block,
   wherein the common resource blocks are indexed from 0 and upwards in a frequency domain for a subcarrier spacing configuration based on the reference point,
   wherein the frequency domain location of the BWP is identified based on the second information, and
   wherein an offset between a reference point in a carrier associated with the BWP and a starting resource block of the BWP is identified based on the second information.

10. The method of claim 9, further comprising:
   transmitting, to the terminal, information on a frequency location of a reference point for uplink as an absolute radio frequency channel number (ARFCN).

11. The method of claim 9, further comprising:
   transmitting, to the terminal, information indicating an absolute radio frequency channel number (ARFCN) for a carrier associated with a secondary cell.

12. The method of claim 9,
   wherein a reference subcarrier spacing is defined per each of a first frequency range and a second frequency range,
   wherein the reference subcarrier spacing is associated with the SS block, and
   wherein the reference subcarrier spacing is assumed for indicating an offset from a lower frequency edge in a carrier.

13. A base station in a wireless communication system, the base station comprising:
   a transceiver configured to receive and transmit signals; and
   a controller coupled with the transceiver and configured to:
      control the transceiver to transmit, to a terminal, a synchronization signal (SS) block,
      control the transceiver to transmit, to the terminal, first information on a reference point associated with common resource blocks,
      control the transceiver to transmit, to the terminal, second information associated with a frequency domain location of a bandwidth part (BWP), and
      control the transceiver to transmit, to the terminal, third information on a subcarrier offset between a lowest subcarrier of the SS block and a lowest subcarrier of at least one of resource blocks which overlaps with the SS block,
   wherein the common resource blocks are indexed from 0 and upwards in a frequency domain for a subcarrier spacing configuration based on the reference point,
   wherein the frequency domain location of the BWP is identified based on the second information, and
   wherein an offset between a reference point in a carrier associated with the BWP and a starting resource block of the BWP is identified based on the second information.

14. The base station of claim 13, wherein the controller is further configured to:
   control the transceiver to transmit, to the terminal, information on a frequency location of a reference point for uplink as an absolute radio frequency channel number (ARFCN).

15. The base station of claim 13, wherein the controller is further configured to:
   control the transceiver to transmit, to the terminal, information indicating an absolute radio frequency channel number (ARFCN) for a carrier associated with a secondary cell.

16. The base station of claim 13,
   wherein a reference subcarrier spacing is defined per each of a first frequency range and a second frequency range,
   wherein the reference subcarrier spacing is associated with the SS block, and
   wherein the reference subcarrier spacing is assumed for indicating an offset from a lower frequency edge in a carrier.

* * * * *